(12) United States Patent
Chaudhary et al.

(10) Patent No.: US 9,088,501 B2
(45) Date of Patent: Jul. 21, 2015

(54) SYSTEMS AND METHODS FOR LEAST CONNECTION LOAD BALANCING BY MULTI-CORE DEVICE

(71) Applicant: Citrix Systems, Inc., Fort Lauderdale, FL (US)

(72) Inventors: Aman Chaudhary, Bangalore (IN); Vishnu Itta, Bangalore (IN); Devesh Prakash, Bangalore (IN); Manikam Muthiah, Bangalore (IN); Jaidev Sridhar, Santa Clara, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 169 days.

(21) Appl. No.: 13/955,807

(22) Filed: Jul. 31, 2013

(65) Prior Publication Data

US 2015/0039763 A1 Feb. 5, 2015

(51) Int. Cl.
*G06F 15/173* (2006.01)
*H04L 12/803* (2013.01)

(52) U.S. Cl.
CPC .................................. *H04L 47/125* (2013.01)

(58) Field of Classification Search
CPC ...................................................... H04L 47/125
See application file for complete search history.

(56) References Cited

U.S. PATENT DOCUMENTS 8,077,622 B2 * 12/2011 Kondamuru et al. ......... 370/237
2004/0111529 A1 * 6/2004 Parmar ......................... 709/245

* cited by examiner

*Primary Examiner* — Vivek Srivastava
*Assistant Examiner* — Nicholas Celani
(74) *Attorney, Agent, or Firm* — Foley & Lardner LLP; Christopher J. McKenna; Paul M. H. Pua

(57) ABSTRACT

The present invention is directed towards systems and methods for load balancing by a multi-core device intermediary between clients and services. The device may establish sub-slots in each slot of the device's packet engines. The number of sub-slots may correspond to the packet engine count. Each slot may track a different number of active connections allocated to a service. The device may assign a first and second service to each packet engine in a first slot corresponding to no active connections. These services may be assigned to different sub-slots in adjacent packet engines. The device may update, responsive to allocation of a first active connection to the first service, the first service from a sub-slot in the first slot of a first packet engine, to a corresponding sub-slot in a second slot. The second slot may correspond to one active connection allocated to the first service.

20 Claims, 30 Drawing Sheets

Table index (identifier)

Number or range of connections covered by identifier

Load Table 600

| Index | Range | | | | |
|---|---|---|---|---|---|
| 0 | [0] | null | | | |
| 1 | [1] | null | | | |
| 2 | [2] | null | | | |
| 3 | [3] | null | | | |
| 4 | [4] | null | | | |
| 5 | [5] | null | | | |
| 6 | [6] | null | | | |
| 7 | [7] | svc B | svc E | | |
| 8 | [8] | svc H | svc A | svc C | |
| 9 | [9-10] | svc D | svc G | svc F | o o o |
| 10 | [11-12] | null | | | |
| 11 | [12-13] | null | | | |
| 12 | [14-15] | o o o | | | |

Service pointer 520

FIG. 6B

Sub slot (with adjust)

SYSTEMS AND METHODS FOR LEAST CONNECTION LOAD BALANCING BY MULTI-CORE DEVICE

FIELD OF THE DISCLOSURE

The present application generally relates to load balancing. In particular, the present application relates to systems and methods for least connection load balancing by multi-core device.

BACKGROUND

Remote computing and centralized management of computing environments have converged to provide remote access to resources and services such as data and application resources, but also to incorporate management aspects including multi-level security (e.g., authentication and firewall policies), support for a variety of access points and client environments, and uniform presentation of resources. Systems, such as network appliances that help to provision applications and/or data to remote users may deliver computing and/or application services in a variety of ways. For example, dedicated servers may provide access to particular services such as software applications by delivering application components to a remote client for execution. Network appliances may provide proxy functions and applications such as secured session establishment, load balancing and content switching. As application and computing needs evolve, such systems may have to provide a higher level of service in both delivery and performance. Accordingly, some of these systems may provide increased levels of parallel processing or multi-tasking by incorporating multiple hardware and software engines to process packets and to support various applications.

BRIEF SUMMARY

The present disclosure is directed towards methods and systems for least connection load balancing by a multi-core device. The multi-core device may provide at least one client access to a plurality of services, via at least one packet engine (PE) executing on cores of the multi-core device. In certain embodiments, such as at low traffic rates, load balancing using a least-connections approach may lead to uneven load balancing across the PEs. Recently-added services may receive more incoming parallel requests or connections, resulting in distribution skew. The present methods and systems may incorporate a subslotting scheme to address the distribution skew. The load balancer may stop sending traffic to a service on all packet engines if the service was heavily favored on a PE a while back. The subslotting scheme may also address the side-effect of averaging and/or ordering in the least-connections approach's stats sync process. Under the subslotting scheme, a plurality of active services may be placed in subslots corresponding to each PE, while the sub-slots reside in slots that tracks the number of active connections handled by a particular service. The number of subslots in each slot may be configured to be equal to the number of available PEs. By placing services in different subslots across PEs, skew due to the ordering of services may be avoided.

In one aspect, the present invention is related to a method for load balancing a plurality of connections to a plurality of services across a plurality of packet engines of a multi-core device. The method may include establishing a number of sub-slots in each slot of each of a plurality of packet engines executing on a device intermediary between a plurality of clients and a plurality of services. The number of sub-slots may correspond to a number of the packet engines executing on the device. Each of the packet engines may execute on a respective core from a plurality of cores on the device. Each slot of each packet engine may track a different number of active connections allocated to a service accessible via the corresponding packet engine. The device may assign a first service and a second service each having no active connections, to each of the packet engines in a first slot corresponding to no active connections. The first service and the second service may be assigned to different sub-slots of the first slot in adjacent packet engines. The device may update, responsive to allocation of a first active connection to the first service, the first service from a sub-slot in the first slot of a first packet engine of the plurality of packet engines, to a corresponding sub-slot in a second slot of the first packet engine. The second slot may correspond to one active connection allocated to the first service.

In some embodiments, the device may update, responsive to allocation of a first active connection to the second service, the second service from a sub-slot in the first slot of a second packet engine of the plurality of packet engines, to a corresponding sub-slot in a second slot of the second packet engine. The second slot may correspond to one active connection allocated to the second service. The device may update, responsive to removal of the first active connection from the first service, the first service from the sub-slot in the second slot of the first packet engine to the corresponding sub-slot in the first slot of the first packet engine. The device may update, responsive to removal of the first active connection from the first service, the first service from a sub-slot in the Xth slot of the first packet engine to a corresponding sub-slot in the (X−1)th slot of the first packet engine. The device may set a pointer to a next available sub-slot of the Xth slot if no other service remains in the Xth slot, the pointer for use in allocating a new connection to a service.

In some embodiments, the device adds the first service to the first slot of the first packet engine. If no other existing service has been added prior to the slot, the device may set a pointer to a sub-slot of the first slot to which the first service has been added, the pointer for use in allocating a new connection to a service. The device may establish a connections list to track the pointer. If the number of services assigned to each packet engine exceeds the number of packet engines, the device may assign a third service to the sub-slot of each packet engine to which the first service is assigned. If the number of services assigned to each packet engine is less than the number of packet engines, the device may assign the services to a same group of sub-slots for each packet engine. The device may re-assign one or more remaining services to one or more slots of the packet engines if an existing service is removed or a new service added.

In another aspect, the present invention is related to a system for load balancing a plurality of connections to a plurality of services across a plurality of packet engines of a multi-core device. The system may include a plurality of packet engines executing on a device intermediary between a plurality of clients and a plurality of services. A load balancer may execute on the device. The load balancer may establishing a number of sub-slots in each slot of each of the plurality of packet engines. The number of sub-slots may correspond to a number of the packet engines executing on the device. Each of the packet engines may execute on a respective core from a plurality of cores on the device. Each slot of each packet engine may track a different number of active connections allocated to a service accessible via the corresponding packet engine. The load balancer may assign a first service and a second service each having no active connections, to each of the packet engines in a first slot corresponding to no active connections. The first service and the second service may be assigned to different sub-slots of the first slot in adjacent packet engines. The load balancer may update, responsive to allocation of a first active connection to the first service, the first service from a sub-slot in the first slot of a first packet engine of the plurality of packet engines, to a corresponding sub-slot in a second slot of the first packet engine, the second slot corresponding to one active connection allocated to the first service.

In some embodiments, the load balancer updates, responsive to allocation of a first active connection to the second service, the second service from a sub-slot in the first slot of a second packet engine of the plurality of packet engines, to a corresponding sub-slot in a second slot of the second packet engine. The second slot may correspond to one active connection allocated to the second service. The load balancer may update, responsive to removal of the first active connection from the first service, the first service from the sub-slot in the second slot of the first packet engine to the corresponding sub-slot in the first slot of the first packet engine. The load balancer may update, responsive to removal of the first active connection from the first service, the first service from a sub-slot in the Xth slot of the first packet engine to a corresponding sub-slot in the (X−1)th slot of the first packet engine.

In some embodiments, the load balancer sets a pointer to a next available sub-slot of the Xth slot if no other service remains in the Xth slot. The pointer may be for use in allocating a new connection to a service. The load balancer may add the first service to the first slot of the first packet engine, and if no other existing service has been added prior to the slot, and sets a pointer to a sub-slot of the first slot to which the first service has been added. The pointer may be for use in allocating a new connection to a service. The load balancer may establish a connections list to track the pointer. If the number of services assigned to each packet engine exceeds the number of packet engines, the load balancer may assign a third service to the sub-slot of each packet engine to which the first service is assigned. If the number of services assigned to each packet engine is less than the number of packet engines, the load balancer may assign the services to a same group of sub-slots for each packet engine. The load balancer may re-assign one or more remaining services to one or more slots of the packet engines if an existing service is removed or a new service added.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 6B is a block diagram of an embodiment of a data structure for efficiently load balancing services based on fewest connections by decreasing granularity of service selection as a number of fewest connections serviced by the services increases;

Figure 1A:
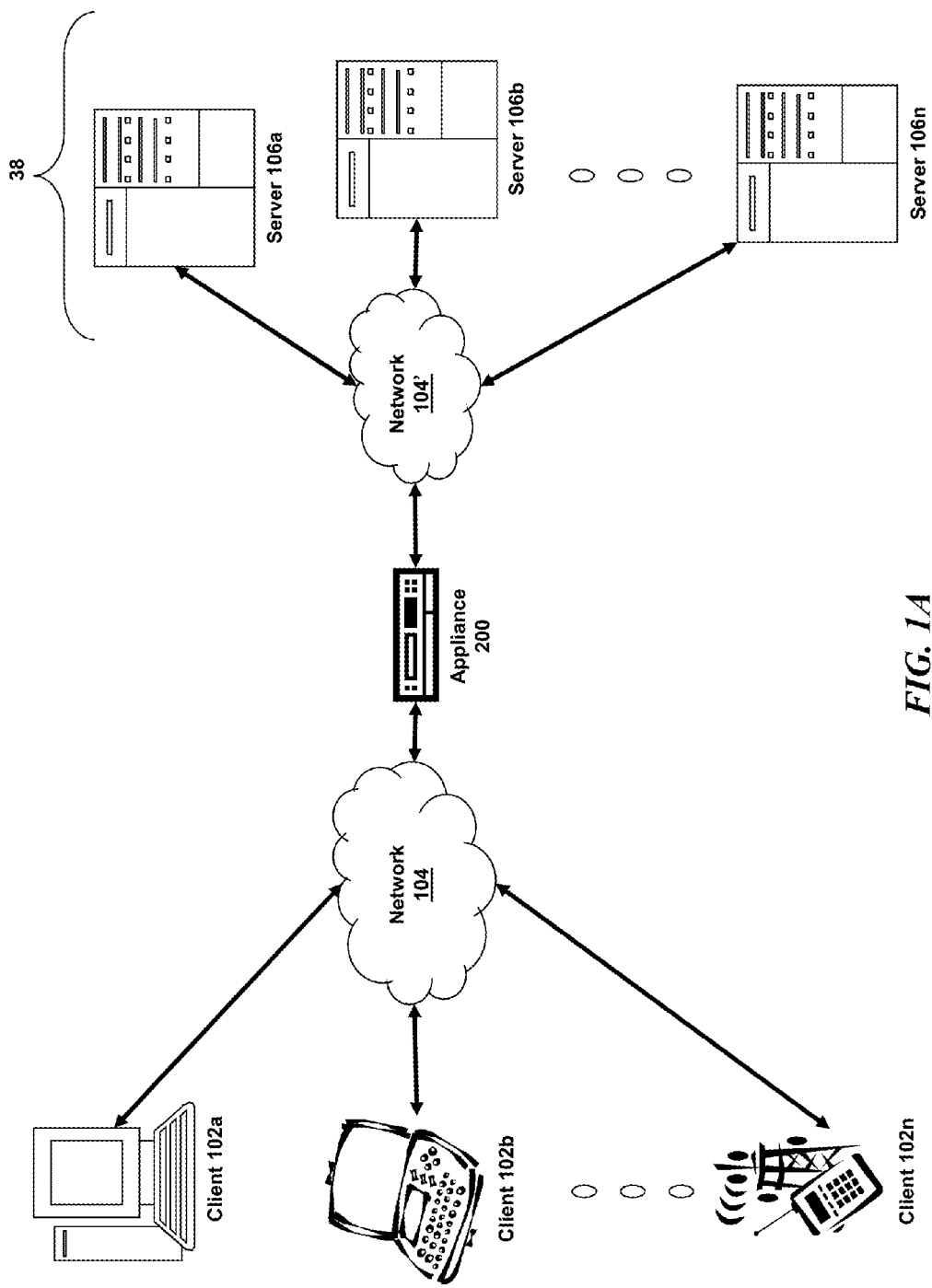
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for efficient load balancing; and Section G describes embodiments of systems and methods for Least Connection load balancing by a multi-core device.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality for identifying and providing address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
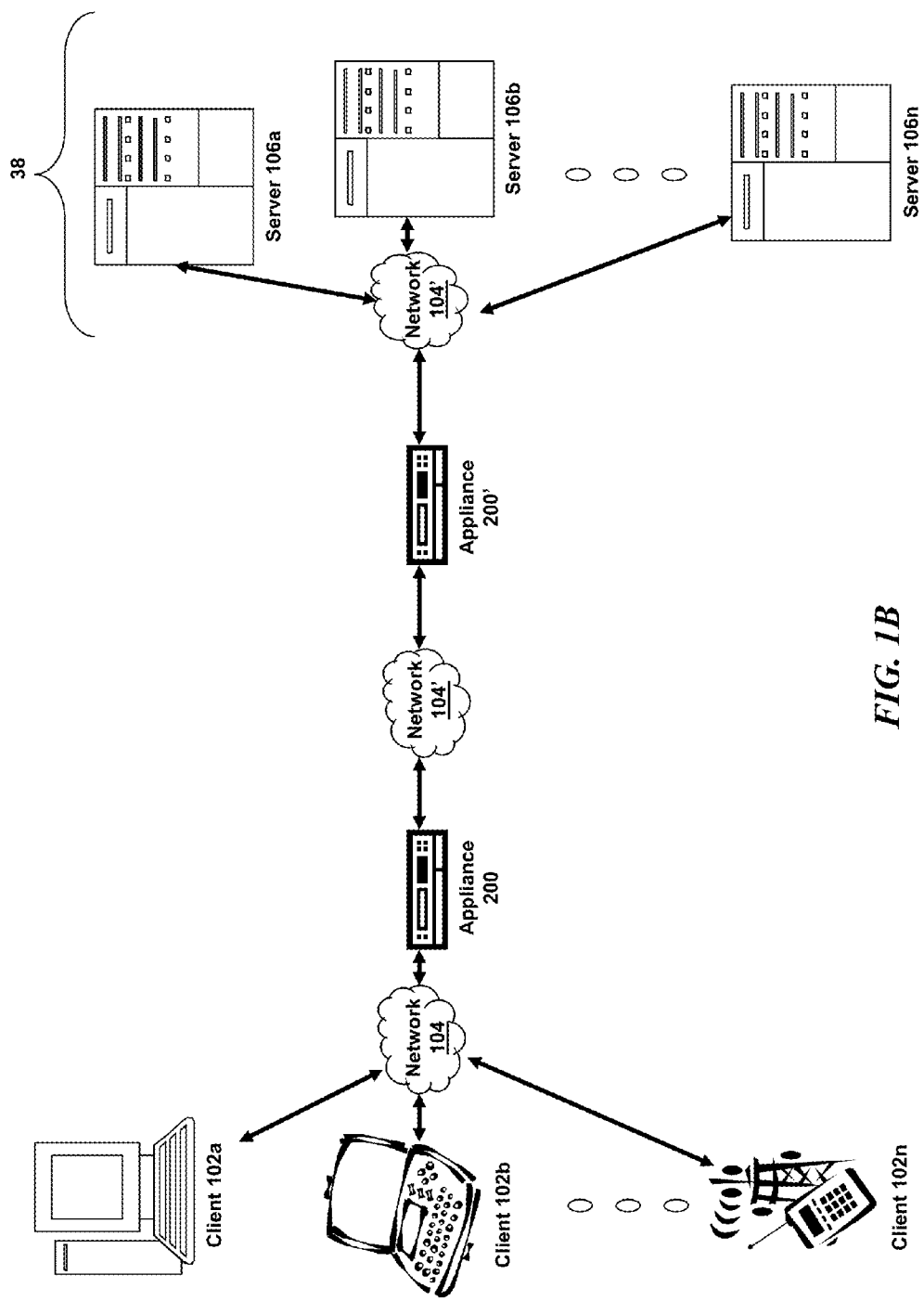
FIG. 1B is a block diagram of an embodiment of an environment for delivering a computing environment from a server to a client via an appliance.
Figure 1C:
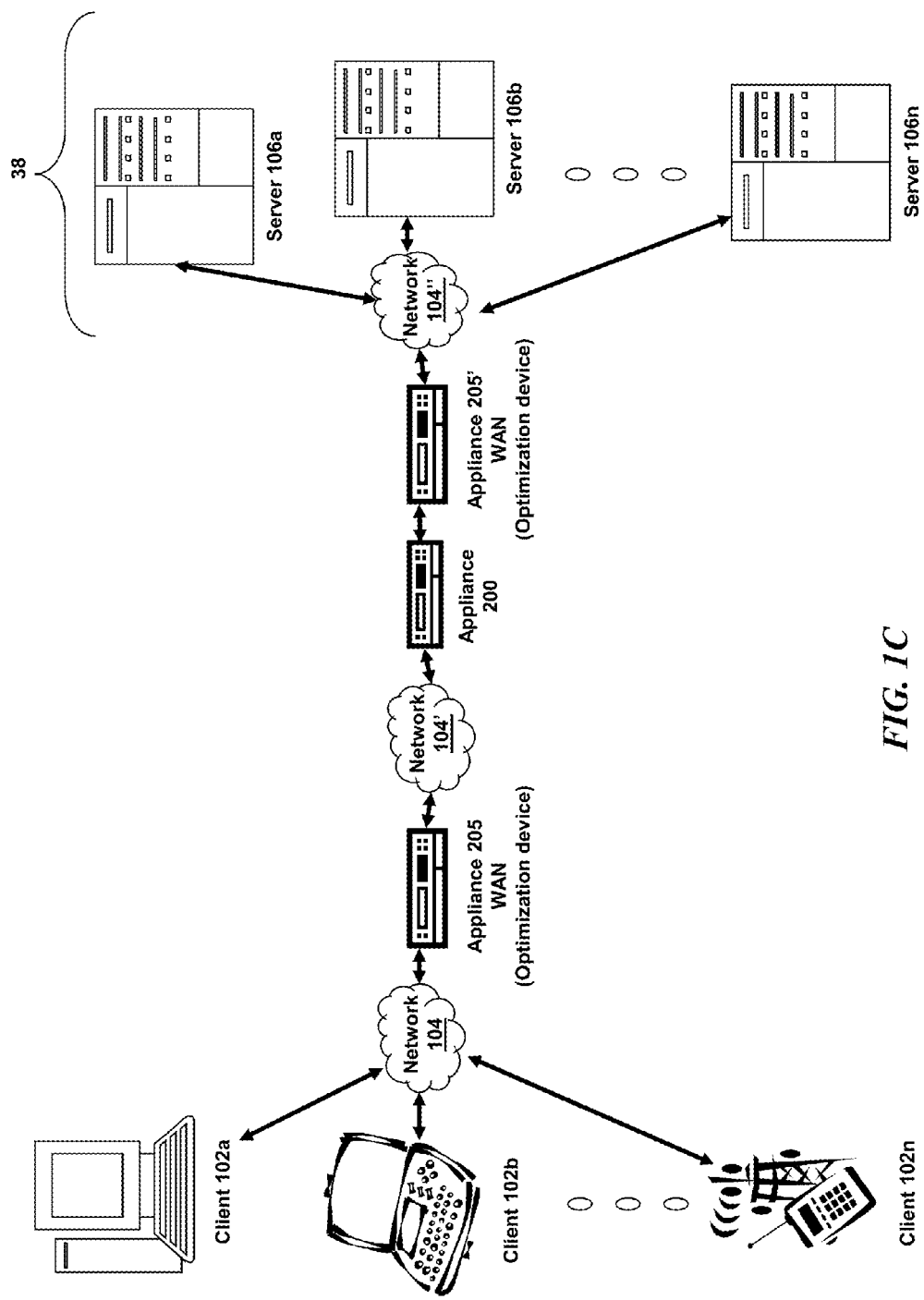
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104''. In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'.

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
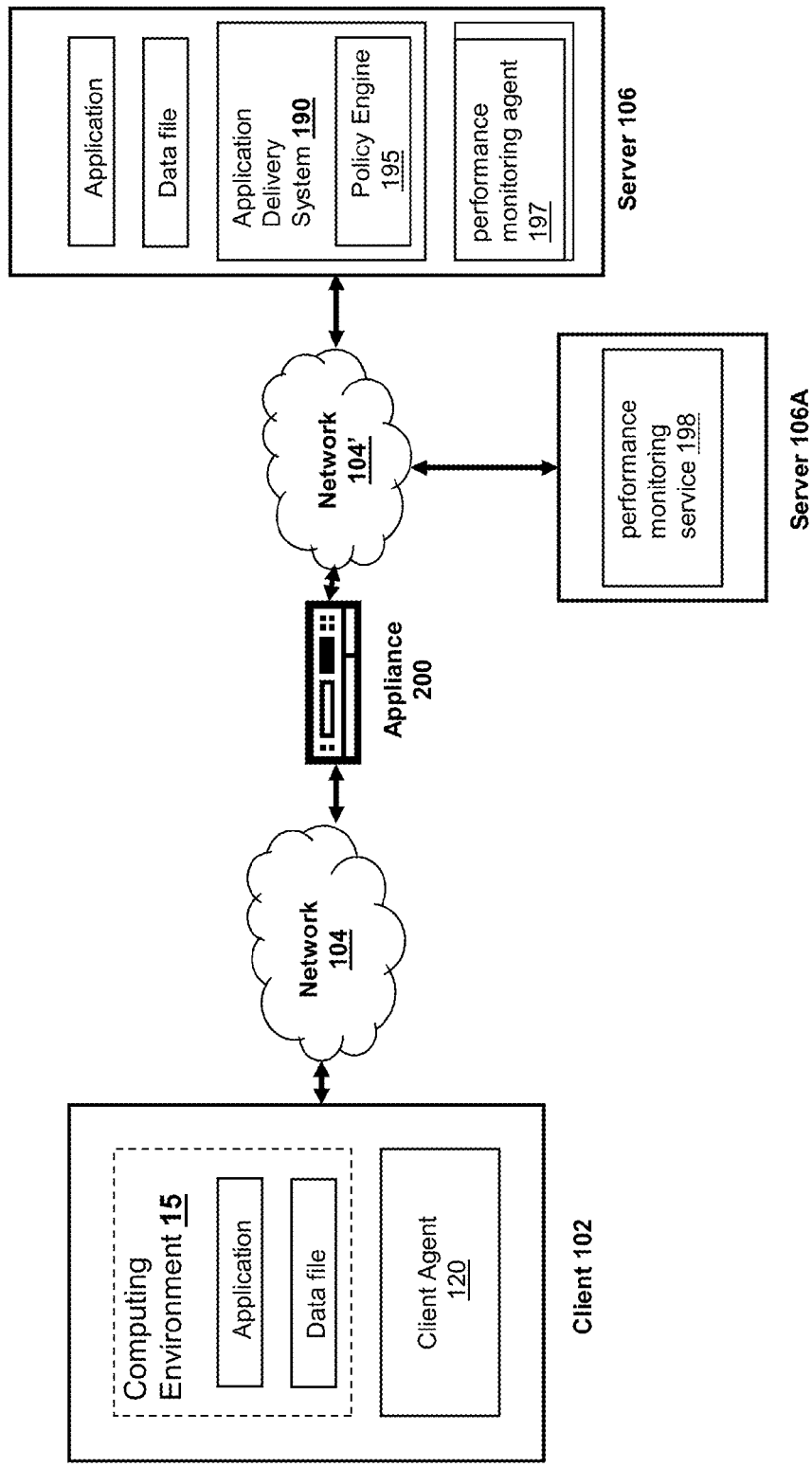
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
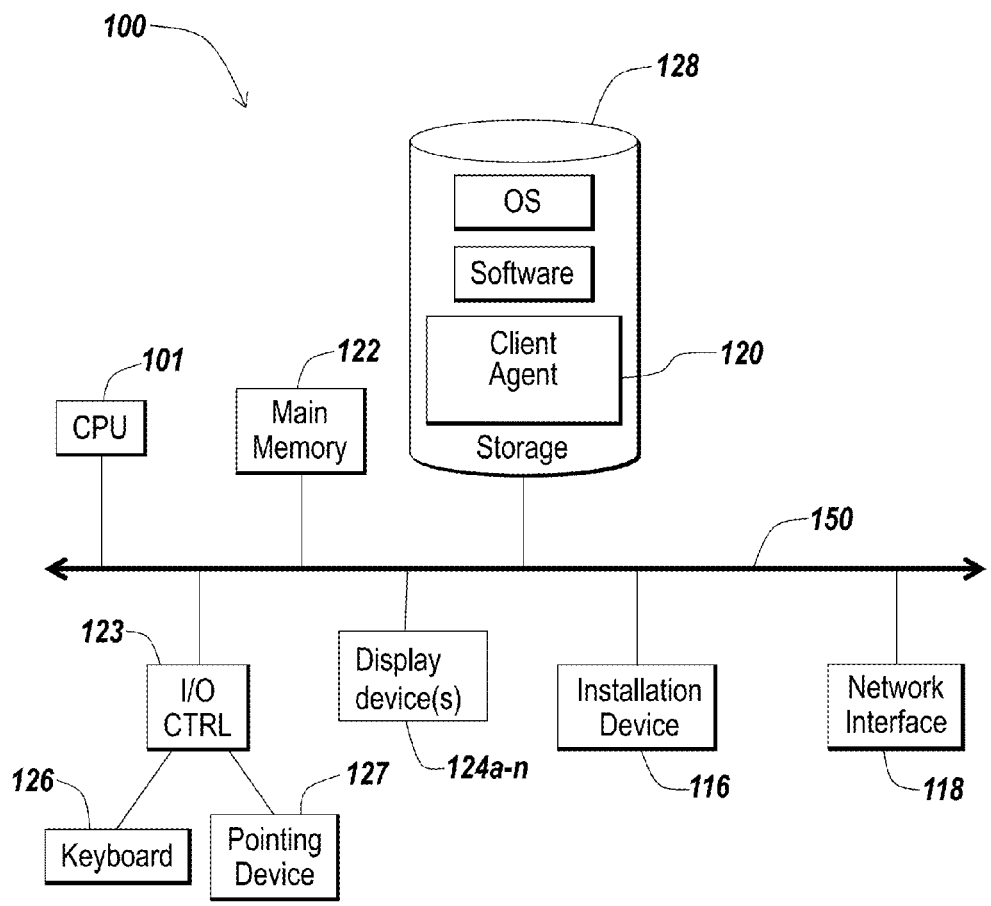
FIGS. 1E-1H are block diagrams of embodiments of a computing device.
Figure 1F:
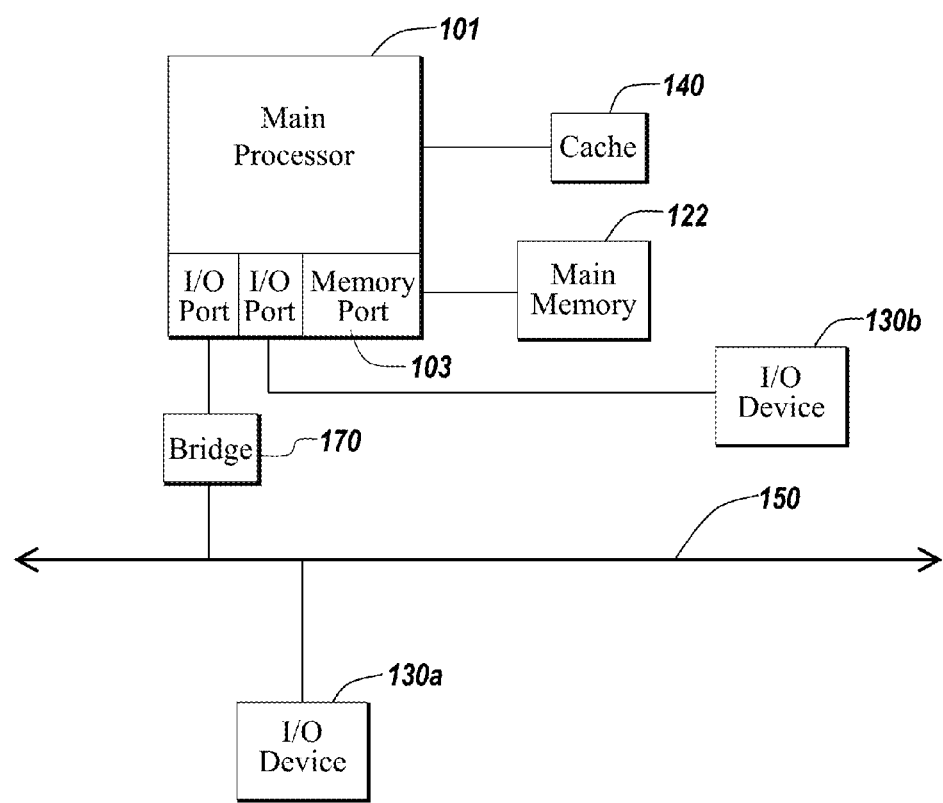

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch- Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
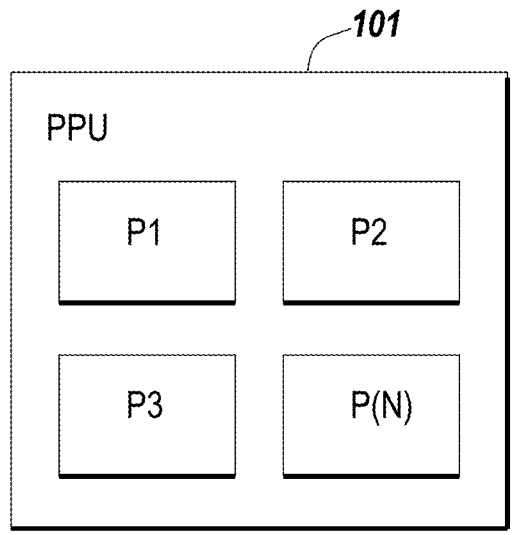

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
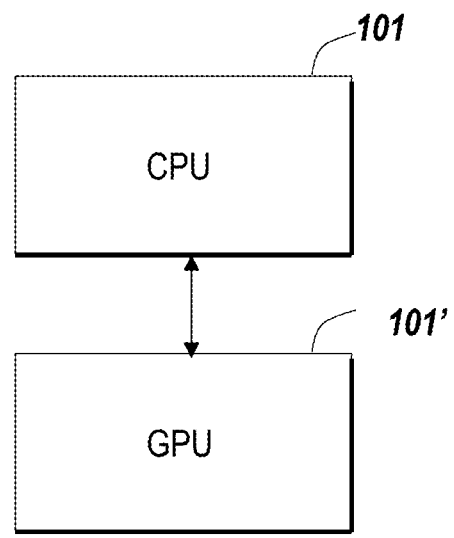

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
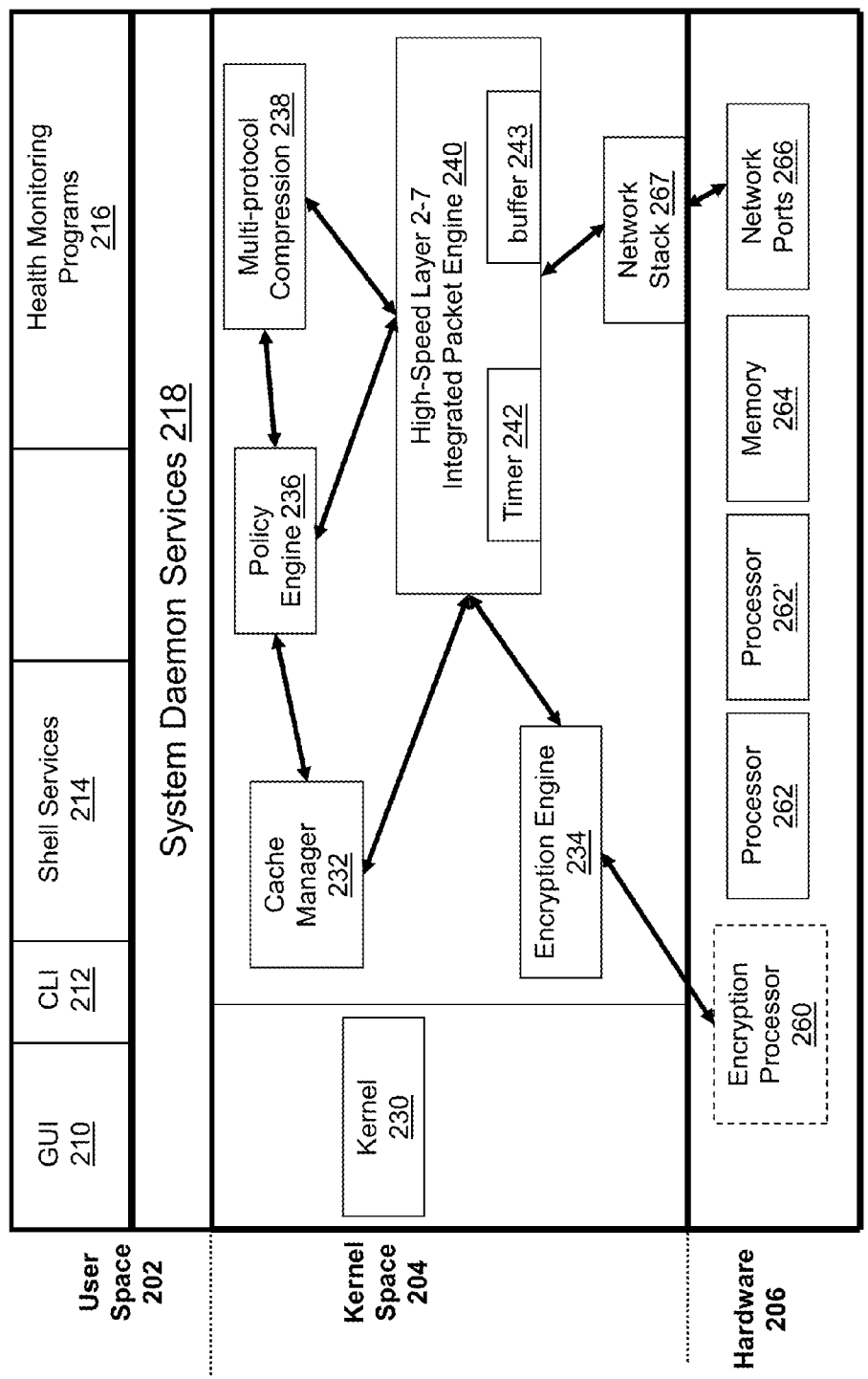
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may need longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
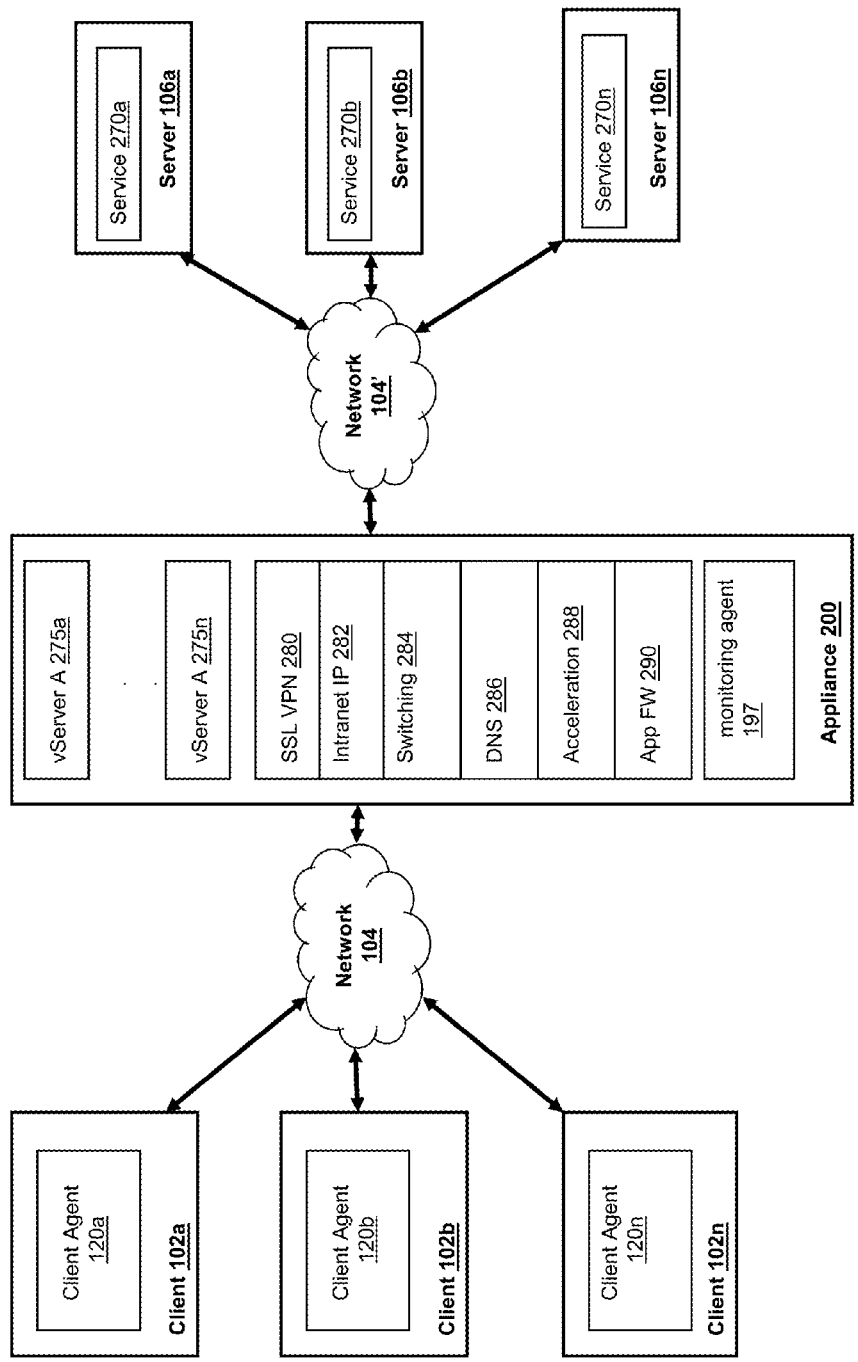
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction may be required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) some required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such as an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
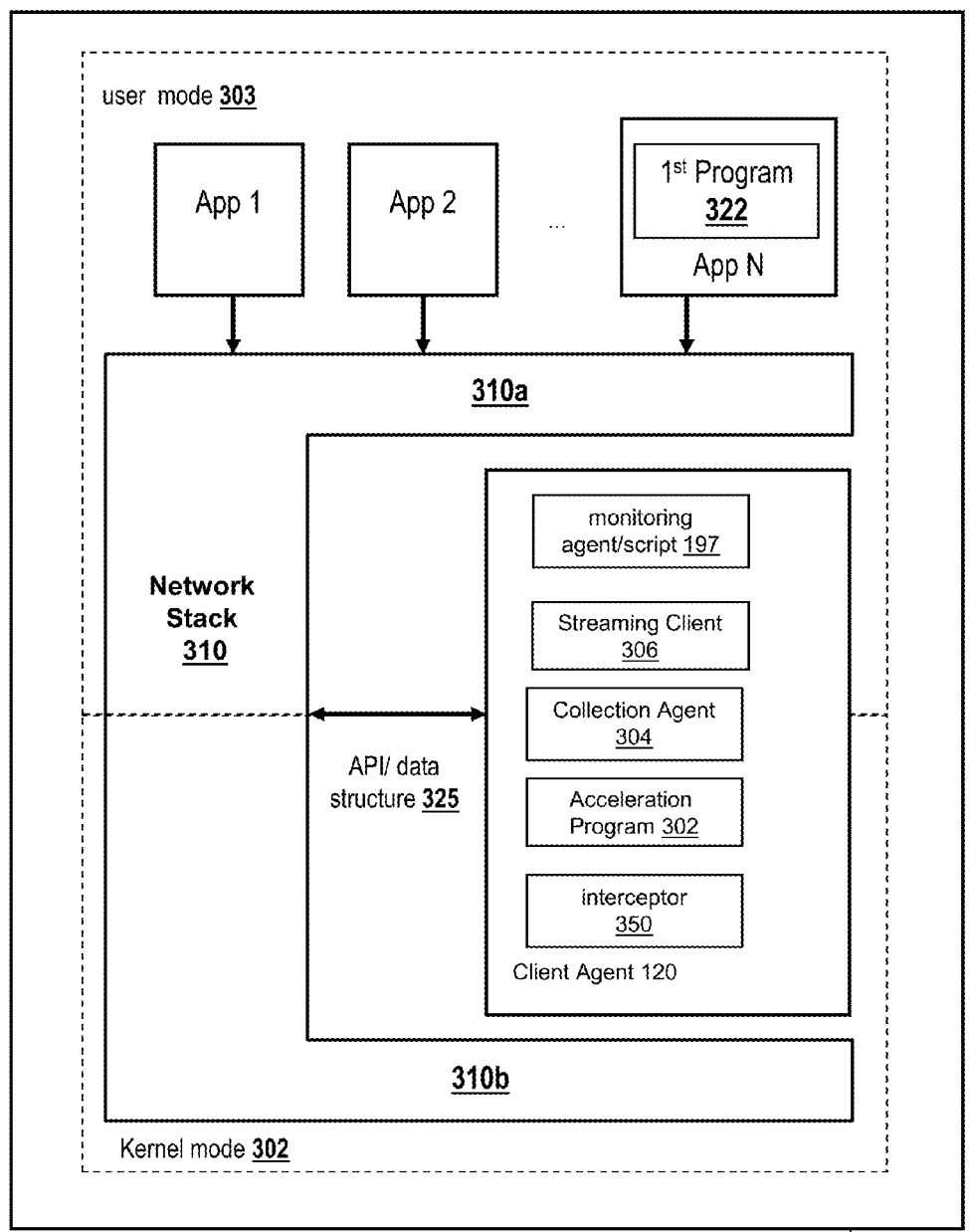
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such as an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
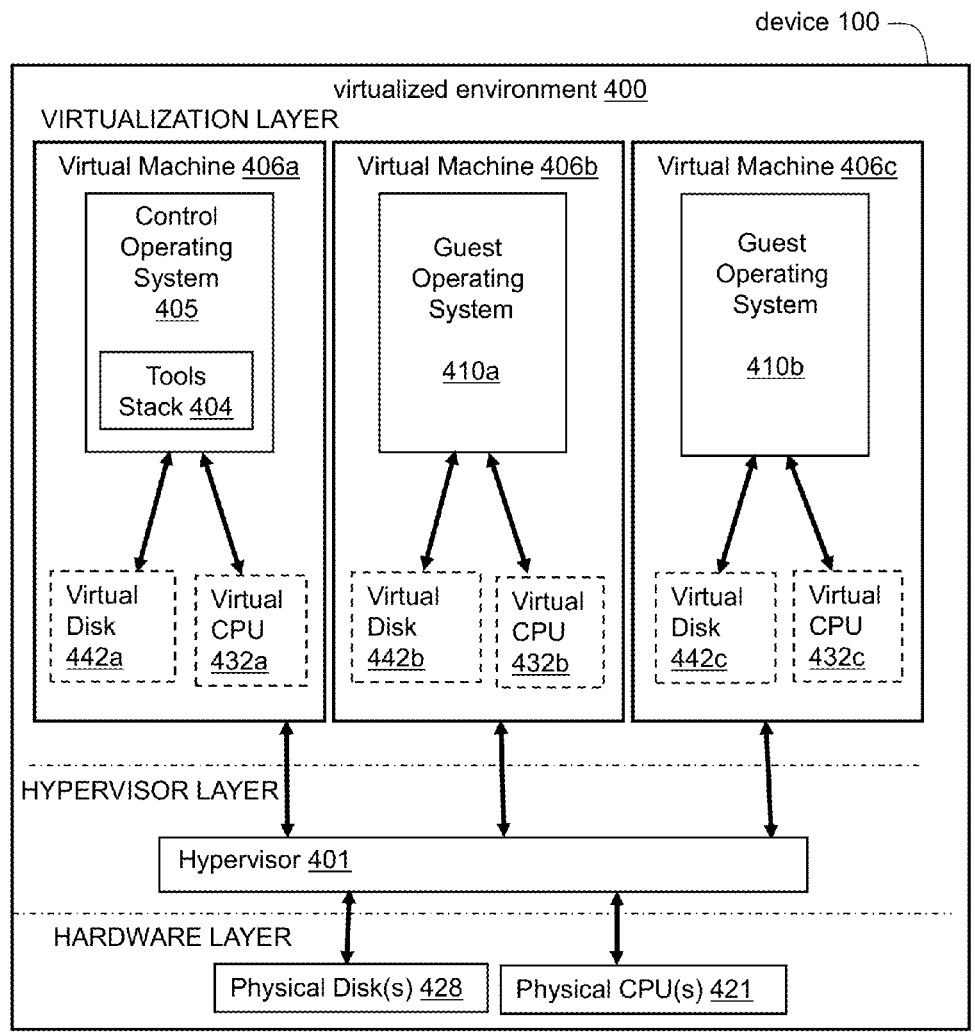
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
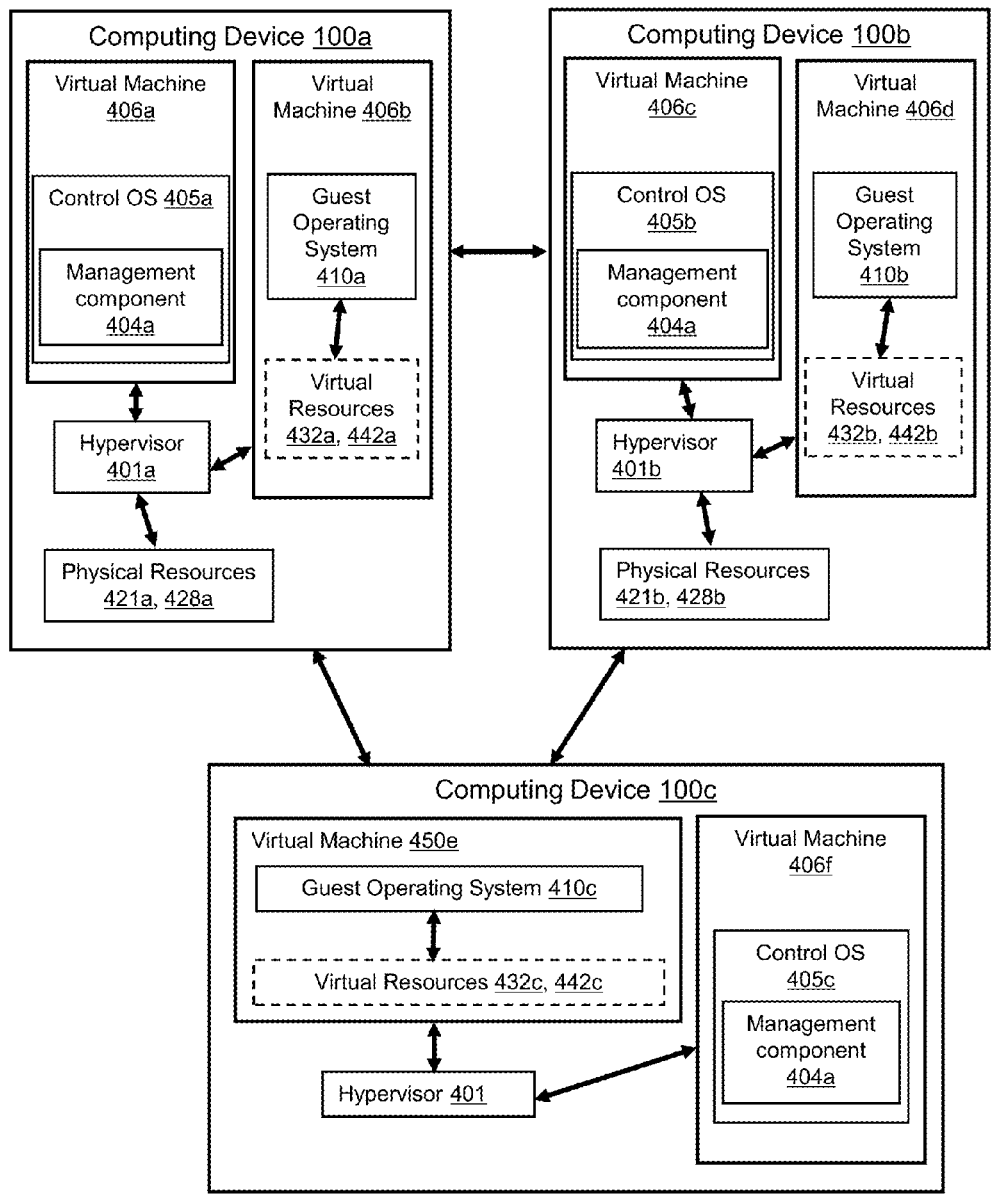
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
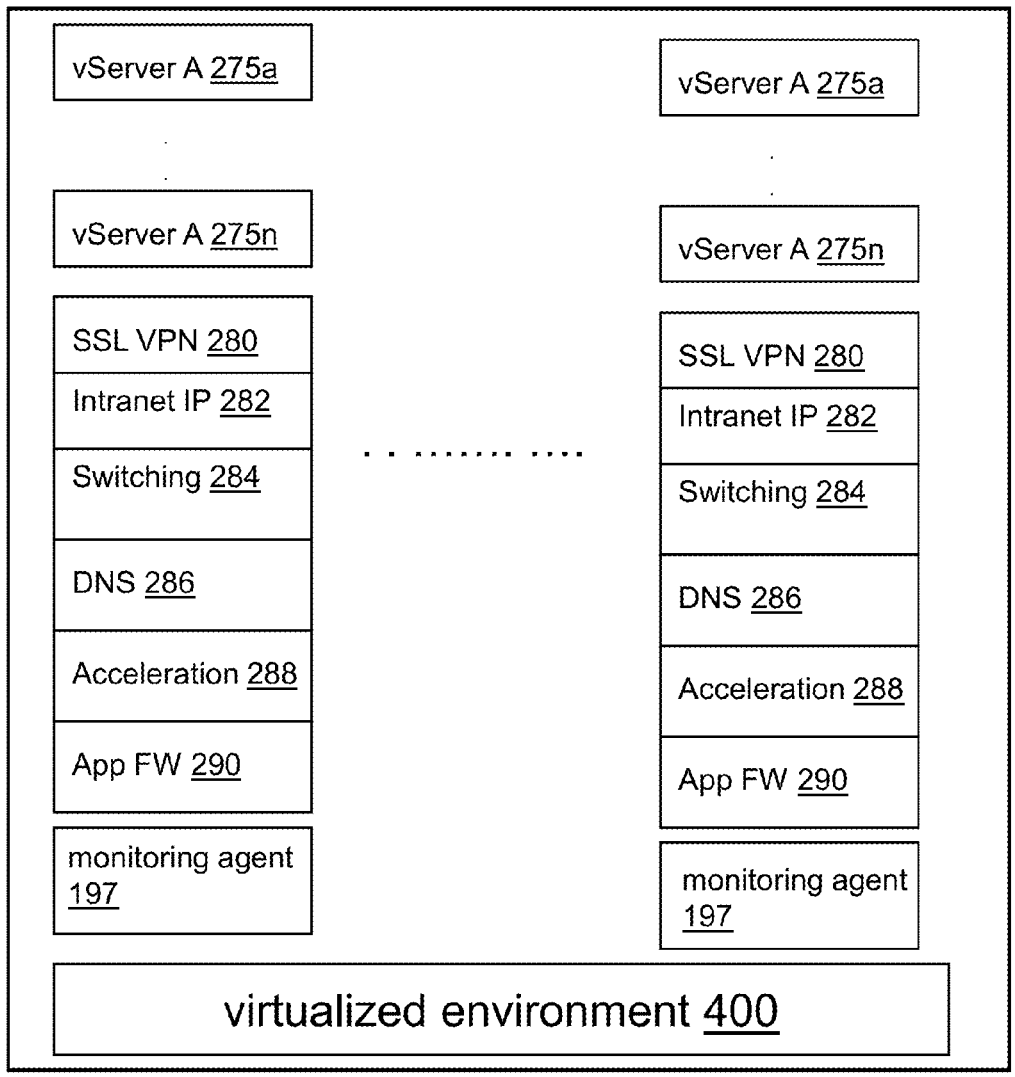
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7X increase in performance and scalability.

Figure 5A:
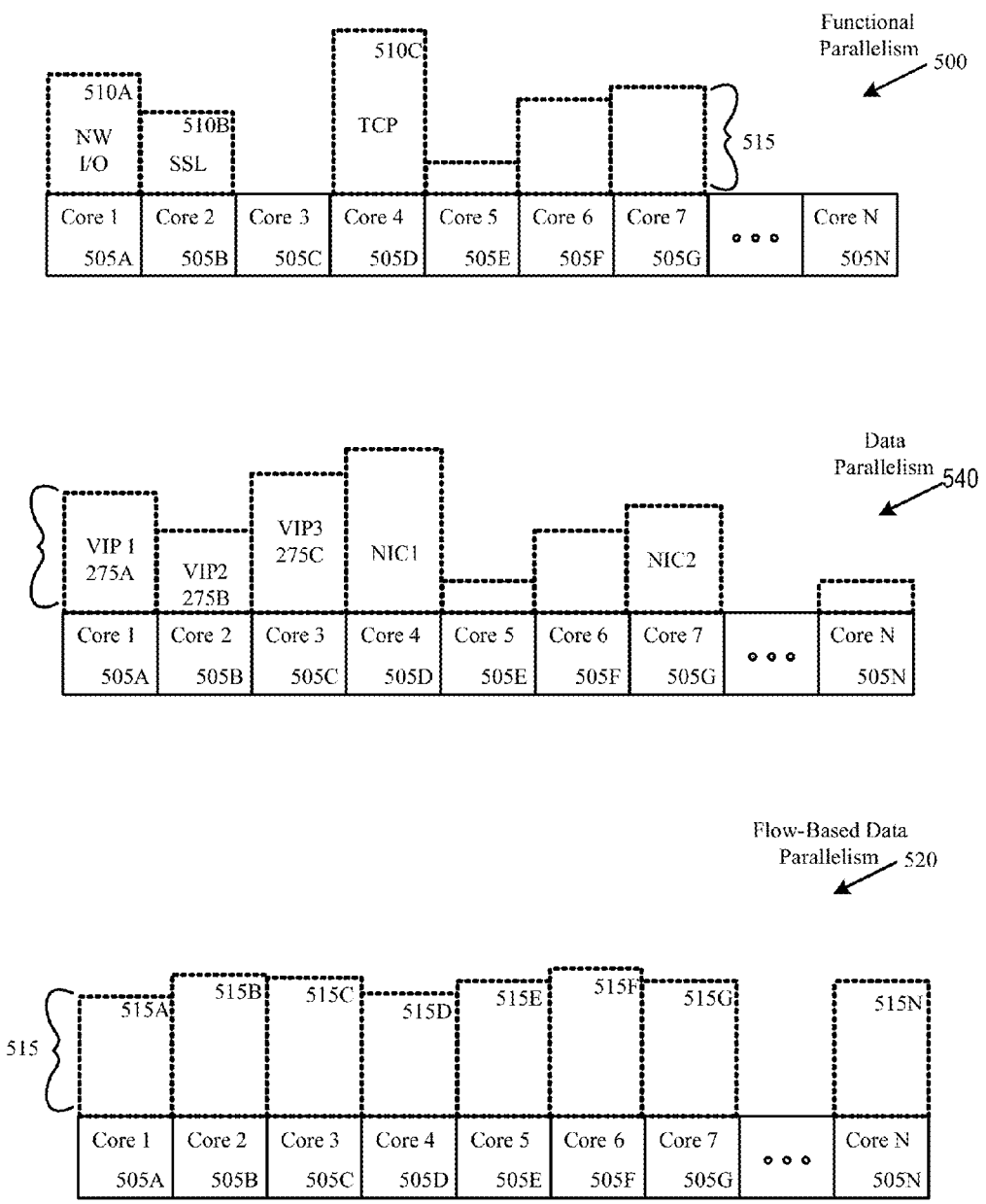
FIG. 5A are block diagrams of embodiments of approaches to implementing parallelism in a multi-core network appliance.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
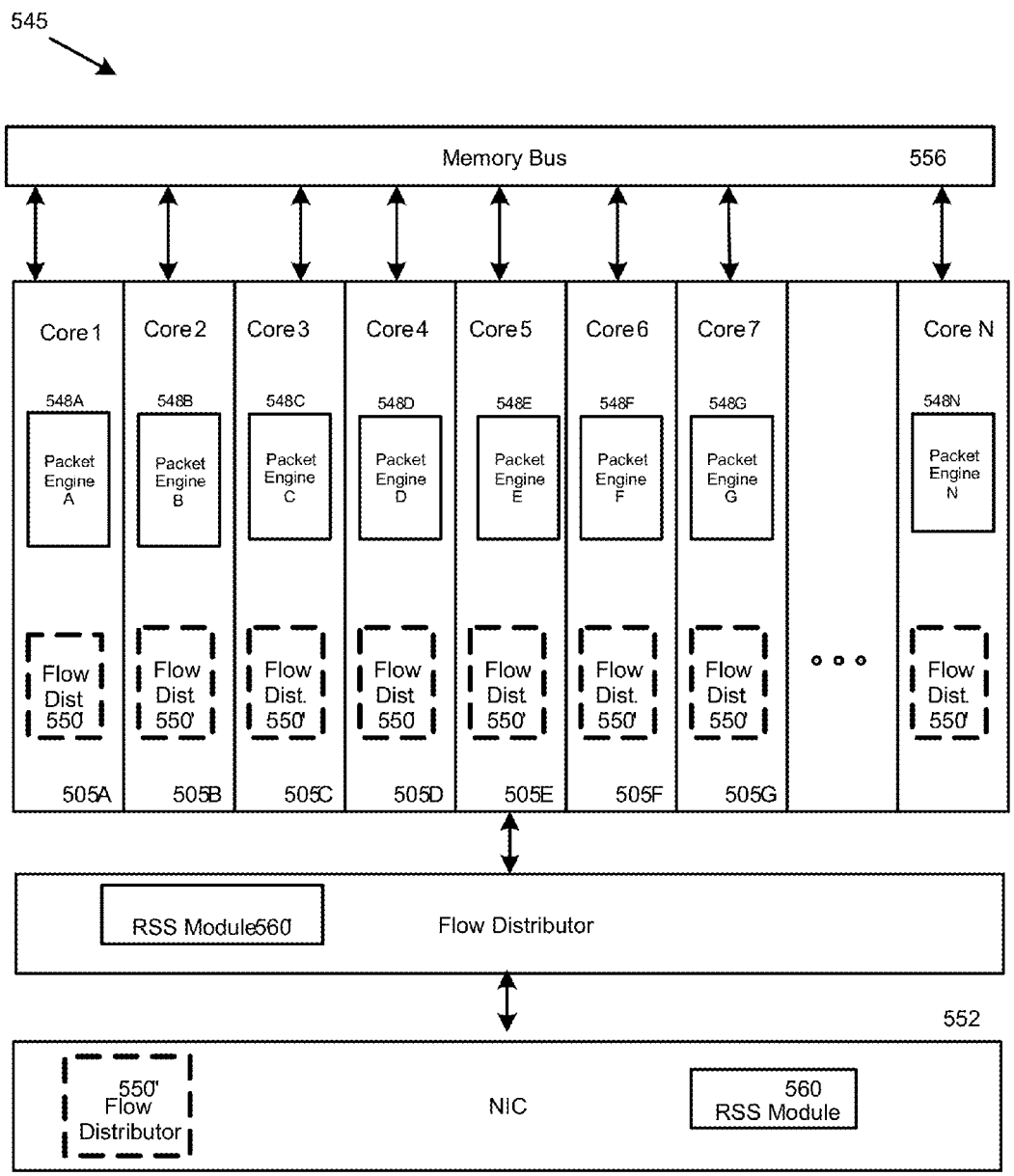
FIG. 5B is a block diagram of an embodiment of a system utilizing a multi-core network application.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, provide that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/or manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software. In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

4-tuple of source TCP Port, source IP version 4 (IPv4) address, destination TCP Port, and destination IPv4 address.

4-tuple of source TCP Port, source IP version 6 (IPv6) address, destination TCP Port, and destination IPv6 address.

2-tuple of source IPv4 address, and destination IPv4 address.

2-tuple of source IPv6 address, and destination IPv6 address.

2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hash result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
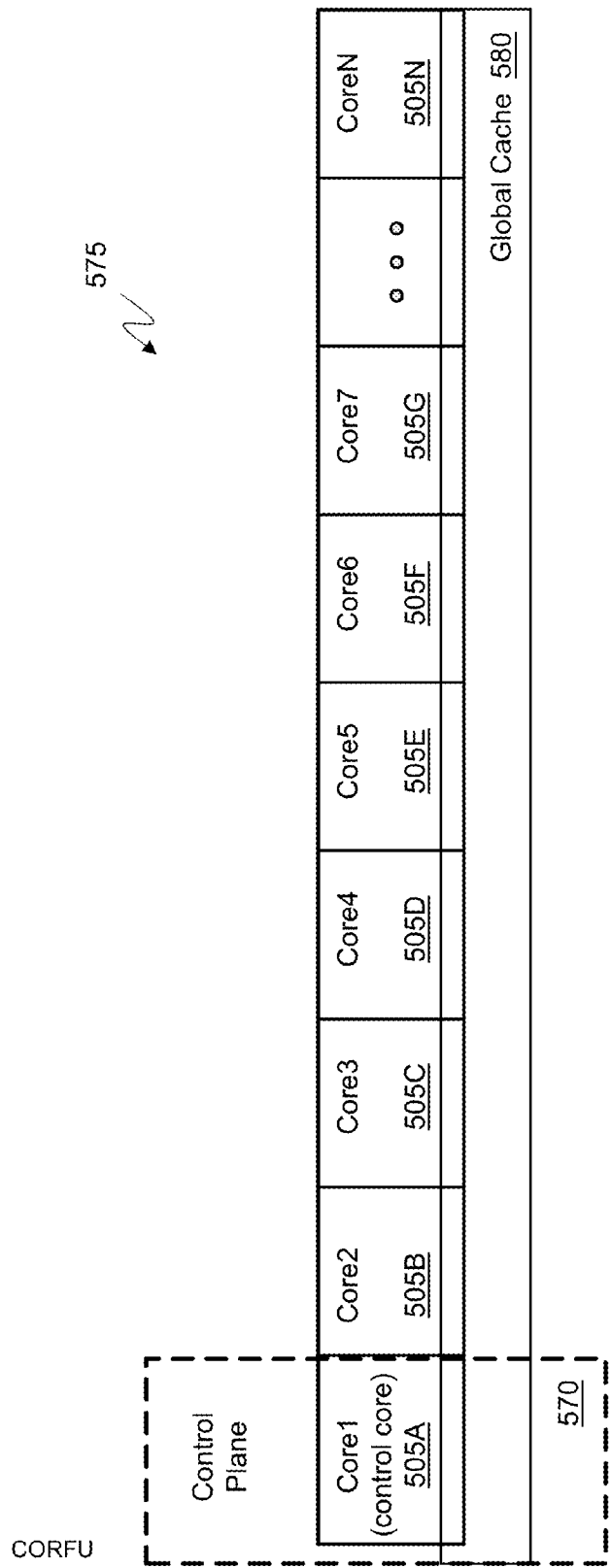
FIG. 5C is a block diagram of an embodiment of an aspect of a multi-core network appliance.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Efficient Load Balancing

Figure 6A:
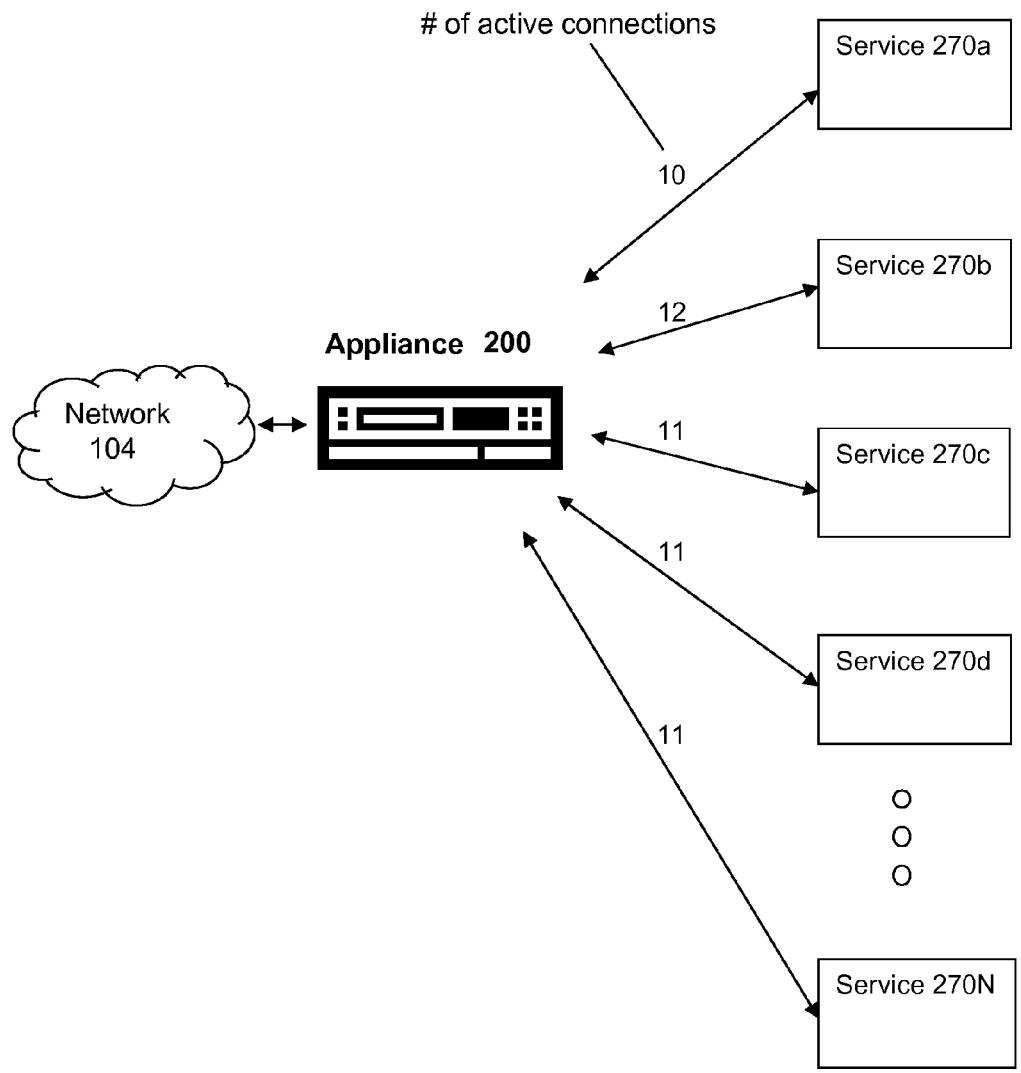
FIG. 6A is a block diagram of an embodiment of an system with an appliance 200 distributing connections received from a network 104 to a plurality of services 270.

Referring now to FIG. 6A, a block diagram is shown illustrating an embodiment of an appliance 200 distributing connections received from a network 104 to a plurality of services 270. In brief overview, an appliance 200 forwards requests to a plurality of services 270a, 270b . . . 270n, each service servicing a number of connections indicated. For example, service 270a is servicing 10 active connections. Each of the services 270 may comprise any functionality for receiving and transmitting data, and may comprise, without limitation, one or more processes, programs, devices, and/or daemons. In some embodiments, multiple services 270 may be hosted on a single server or other computing device. In other embodiments, each service 270 may reside on a separate computing device. In some embodiments, a service 270 may utilize a plurality of devices. For example, a service for responding to HTTP requests may comprise both a web server and a database of user information, which may reside on separate computing devices.

For an appliance serving as an intermediary for a plurality of services where each service is capable of handling similar requests, it may be desirable for the server to load balance when distributing connection requests or other requests to one of the services. In FIG. 6A, the appliance may use any of the algorithms, systems, and methods described herein in order to approximately evenly distribute the number of active connections serviced by each of the plurality of services. In other embodiments, an appliance may use methods described herein to roughly evenly distribute connections based on any other metric including, without limitation, weighted connections, bandwidth, service processor load, and/or service response time. Although FIG. 6A shows a single appliance, in other embodiments, a plurality of appliances may receive and distribute requests for services 270 according to any of the methods described herein. Although FIG. 6A shows an appliance allocating connections to services, it should be appreciated that the methods described herein may be applied to distributing requests among any set of potential recipients, including without limitation clients, client agents, servers, server agents, appliances, and vServers. Although this description will often refer to connection requests, it should be understood that the techniques are applicable to any types of requests, including, for example, HTTP requests.

Figure 6C:
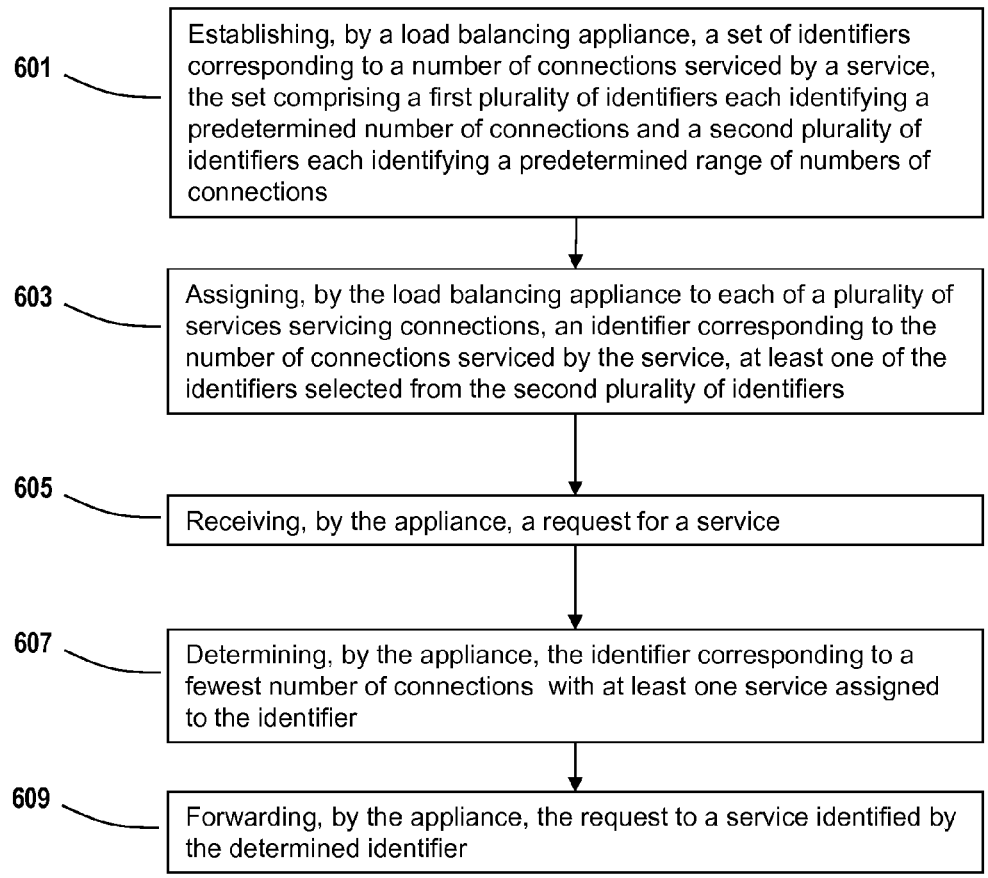
FIG. 6C is a flow diagram of an embodiment of a method for efficiently load balancing services based on fewest connections by decreasing granularity of service selection as a number of fewest connections serviced by the services increases.

Referring now to FIGS. 6B and 6C, a data structure and method which may be used by an appliance to distribute connection requests to the service having the least current active connections is depicted. In brief overview, the method includes establishing, by a load balancing appliance, a set of identifiers corresponding to a number of connections serviced by a service. The set of identifiers comprises a first plurality of identifiers each identifying a predetermined number of connections and a second plurality of identifiers each identifying a predetermined range of numbers of connections (step 601). The appliance assigns to each of a plurality of services servicing connections an identifier corresponding to the number of connections serviced by the service. At least one of these identifiers is selected from the second plurality of identifiers (step 603). The appliance receives a request for a service (step 605), and determines the identifier corresponding to a fewest number of connections with at least one service assigned to the identifier (step 607). The appliance then forwards the request to a service identified by the determined identifier (step 609). In some embodiments, the method may be performed by a switching/load balancing component 284 of an appliance. Although the method is described below in the context of an appliance, in other embodiments the method may be used by any computing device, such as a client, client agent, server, or server agent.

Still referring to FIGS. 6B and 6C, now in greater detail, a load balancing appliance may establish a set of identifiers corresponding to a number of connections serviced by a service in any manner (step 501). In some embodiments, the identifiers may correspond to rows in a table, such as the load table 600. In the load table 600, each row of the table corresponds to a given number or range of numbers of connections. For example, in the table 600 shown, row (or identifier) 8 contains a listing of services that each have 8 current active connections. Row (or identifier) 9 corresponds to a listing of services that each have either 9 or 10 current active connections. A load table may use any data structure or structures to store the services within the table. In some embodiments, a load table may comprise a fixed size one-dimensional array. Each slot in the array may either store a null pointer if no services have the number of connections corresponding to that slot, or a pointer to a linked list of services having the number of active connections indicated by the slot. In other embodiments, a load table 600 may comprise a two-dimensional array. The appliance may establish any number of identifiers. In some embodiments, the total number of identifiers may be fixed. For example, the identifiers may correspond to rows of a fixed-size table. The fixed-size table may be any size including, without limitation, 8, 16, 32, 64, 128, 256, 512, 1024, 2048, and 4096 rows. In some embodiments, the fixed size table may be a predetermined number of bytes.

In establishing the set of identifiers (step 601), the set may comprise a first plurality of identifiers each identifying a predetermined number of connections and a second plurality of identifiers each identifying a predetermined range of numbers of connections. An identifier may be any integer, character, byte sequence and/or bit sequence used to designate a number or range of connections corresponding to a service. The first and second pluralities may be any size. For example, a first plurality of identifiers might comprise eight identifiers, as in FIG. 6B, corresponding to services with 0, 1, 2, 3, 4, 5, 6, and 7 active connections, respectively. A second plurality of identifiers might comprise 4 identifiers corresponding to services with 8-9, 10-11, 12-13, and 14-15 connections, respectively. In some embodiments, the set of identifiers may comprise a third, fourth, fifth, sixth, or any other number of pluralities of identifiers each identifying different predetermined ranges of numbers of connections. To continue the previous example, a third plurality of identifiers may comprise 4 identifiers corresponding to 16-19, 20-23, 24-27, and 28-31 connections, respectively.

In some embodiments, the identifiers and predetermined ranges may be apportioned so that a fixed size table can cover a wide range of potential numbers of active connections. The following table provides an example of how a set of 1024 identifiers (or table indexes) may be apportioned with different predetermined ranges to cover services having up to 8191 connections.

| Table Index | Range | Numbers of Connections covered |
|---|---|---|
| 0-511 | 1 | 0-511 |
| 512-639 | 4 | 512-1023 |
| 640-767 | 8 | 1024-2047 |

-continued

| Table Index | Range | Numbers of Connections covered |
|---|---|---|
| 768-895 | 16 | 2048-4095 |
| 896-1023 | 32 | 4096-8191 |

Figure 6D:
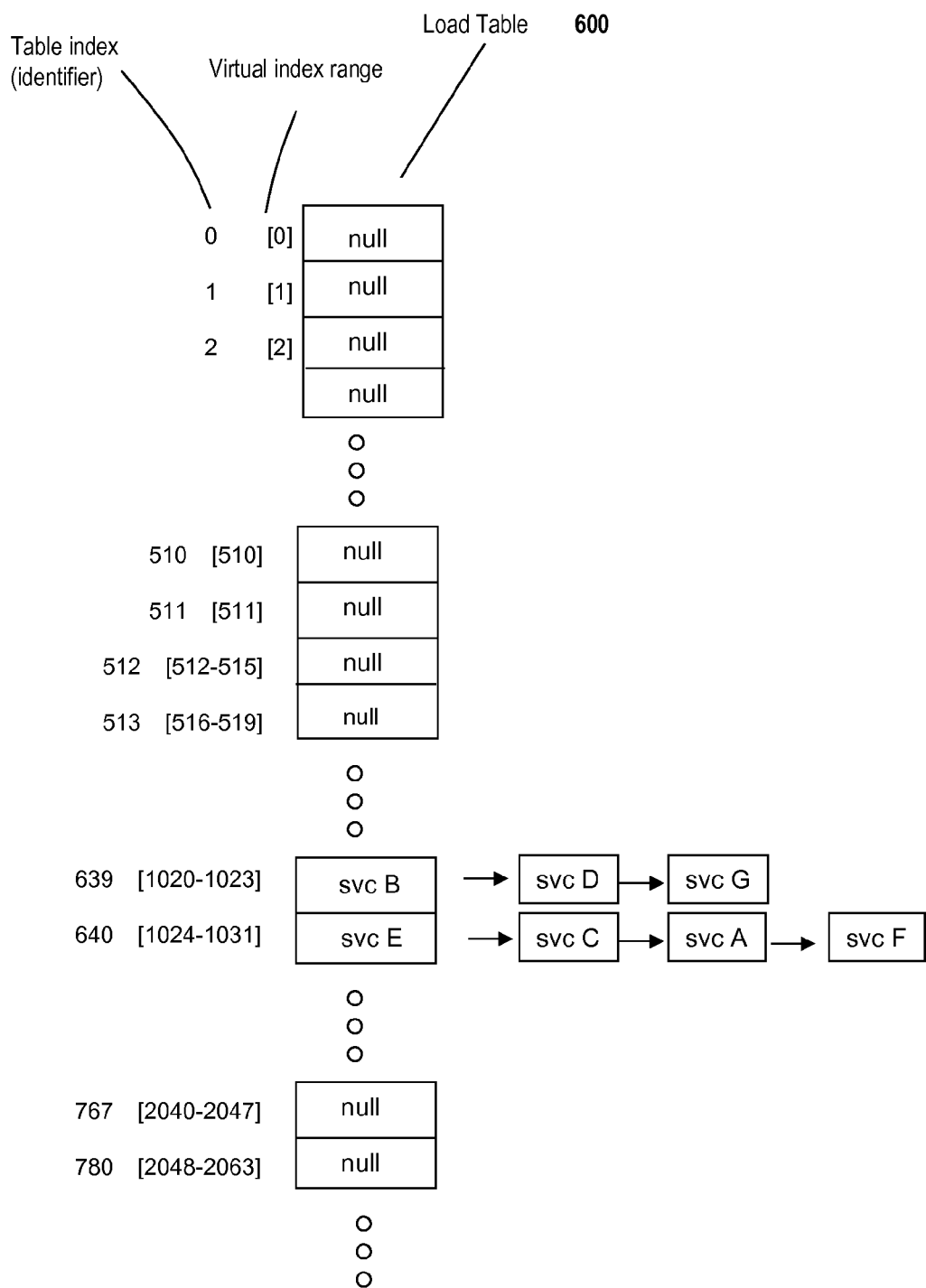
FIG. 6D is a block diagram of another embodiment of a data structure for efficiently load balancing services based on fewest connections by decreasing granularity of service selection as a number of fewest connections serviced by the services increases.

For example, according to the above table, index 45 would be assigned to only services servicing 45 connections, while index 512 would be assigned to services having between 512 and 515 connections. Likewise index 513 would be assigned to services having between 516 and 519 connections. By apportioning identifiers in the above manner, a fixed size table having 1024 entries can be used in conjunction with maintaining the relative number of active connections of services having up to 8191 connections. A pointer to a linked list may be stored in each row of the table with each linked list containing the services corresponding to that row. Referring ahead to FIG. 6D, a portion of such a table is shown. In some embodiments, tables such as the above may be hardcoded into an appliance. In other embodiments, tables such as the above may be customizable by a user or administrator of an appliance.

The appliance assigns, to each of a plurality of services servicing connections, an identifier corresponding to the number of connections serviced by the service, at least one of the identifiers selected from the second plurality of identifiers in any manner (step 603). In some cases, the appliance may assign identifiers to all of the services the appliance is serving as an intermediary for at once. For example, upon startup, the appliance may assign an identifier of "0" to all services. Or, if this particular method of load balancing is started after the appliance has already begun servicing connections, the appliance may iterate through one or more of the services to determine the number of connections serviced, and assign identifiers accordingly. In other cases, the appliance may assign identifiers to a service in response to the appliance detecting a change in the number of connections serviced by the service. For example, upon the appliance forwarding a new connection request to a service, the appliance may increment a record kept of the number of connections assigned to the service, and then assign a corresponding identifier. This assigning of identifiers is discussed in greater detail with respect to FIG. 6A.

The appliance may receive a request for a service from any source and in any manner (step 605). The request may comprise any protocol or protocols including, without limitation, HTTP, FTP, SMTP, ICA, and RDP. The request may be received from any computing device including, without limitation, a client, client agent, server, server agent, or appliance. In some embodiments, the appliance may receive a plurality of requests. In some embodiment, the method described may be triggered in response to receiving a certain number of requests. For example, an appliance may use a round-robin method or other load balancing method for distributing requests until a certain threshold of requests, active connections, or rate of new requests is reached, and then switch to the method described in FIG. 6C.

An appliance may determine the identifier corresponding to a fewest number of connections with at least one service assigned to the identifier in any manner (step 607). This step may comprise checking a variable in which a table index corresponding to the lowest table index having non-null contents is kept. For example, with reference to FIG. 6B, the appliance may maintain a variable which holds the identifier corresponding to a fewest number of connections with at least one service assigned to the identifier. In this case, the variable would store 8, as row 8 contains pointers to services B and E, and no index with fewer connections contains any services. In other embodiments, a variable may be maintained which may contain a direct pointer to a service assigned to the current lowest identifier. Referring to FIG. 6D, the variable may store 639, as it is the lowest identifier which has at least one pointer to a service. A variable maintained to indicate the lowest index having at least one index may be maintained in any manner. In some embodiments, the variable may be updated each time the number of connections serviced by a service is detected to change. In other embodiments, the variable may be updated each time the index assigned to a given service changes. One method for maintaining such a variable will be described in detail in conjunction with FIG. 6A.

The appliance then forwards the request to any service identified by the determined identifier (step 609). In some embodiments, the appliance may select the first service listed under the determined identifier. For example, with respect to FIG. 6B, after determining that 8 was the lowest identifier having services, the appliance may forward a request to service B, as it is listed before service E, which is also identified by 8. It should be noted that this method will not necessarily lead to distributing a received request to the service having the least number of connections. For example, referring to FIG. 6D, an appliance may receive a request and determine that 639 is the lowest identifier having at least one service, and the appliance may then forward the request to service B as the first service identified by 639. Since identifier 639 covers services having between 1020 connections and 1023 connections, it is possible that service B has 1022 connections, while service D has only 1020 connections. However, this method gives an administrator an ability to adjust the granularity of the load balancing based on how wide the predetermined ranges are. The performance difference may be negligible between a service having 1022 connections and a service having 1020 connections and so the range of 4 is justified by the table space saved and the computational simplicity gained by grouping those numbers of connections together. Likewise, the performance difference may be substantial between a service having 30 connections and a service having 31 connections, and so the range of 1 at the lower numbers 1-511 may also be justified.

In some embodiments, any allocation of ranges may be used in conjunction with a set of identifiers. In some embodiments, there may be no identifiers which are assigned a single number of connections. For example, the following table presents another example listing wherein all identifiers identify a range of at least four connections.

| Table Index | Range | Numbers of Connections covered |
|---|---|---|
| 0-50 | 4 | 0-199 |
| 51-100 | 8 | 200-599 |
| 101-200 | 16 | 600-2199 |
| 201-400 | 32 | 2200-8799 |

G. Systems and Methods for Least Connection Load Balancing by a Multi-Core Device In some aspects, the present disclosure is directed towards systems and methods for least connection load balancing by a multi-core device. Embodiments of these systems and methods may support or incorporate features of least connection load balancing (LB), for example as described above in connection with section F, and may provide even distribution of incoming transactions or connections across services bound to any given vservers, packet engine (or packet processing engine) or core of a multi-core device such as any embodiment of an appliance 200 or device discussed above in connection with FIGS. 2A, 2B, 3, 4A and 6A. The transactions, connections, loads or other work unit distributed to and/or handled by a service may be referred to as "transactions" or "connections".

Figure 7A:
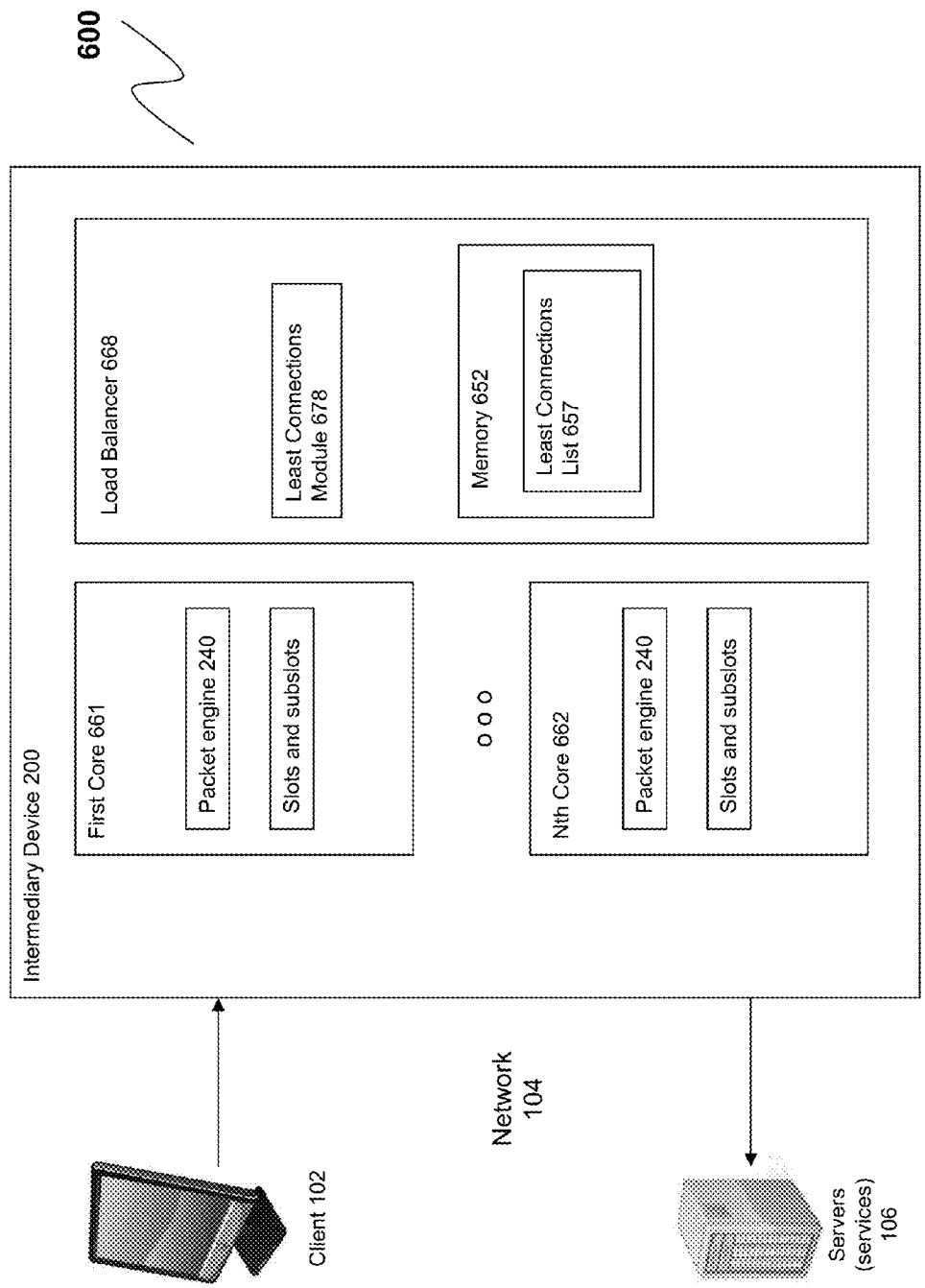
FIG. 7A is a block diagram of an embodiment of an system for least connection load balancing by a multi-core device.

FIG. 7A depicts one embodiment of a system for least connection load balancing by a multi-core device. The multi-core device may provide one or more clients access to a plurality of services, via at least one packet engine (PE) executing on cores of the multi-core device. The device may include a load balancer 668, comprising hardware and/or software executing on hardware (e.g., a core) of the device. The load balancer may include a least-connections engine for distributing or allocating connections/transactions between services in accordance with any of the methods or features described above in connection with Section F.

In certain embodiments, such as at low traffic rates, load balancing using a least-connections approach may lead to uneven load balancing across the PEs. To address the side-effect of averaging and/or ordering in the least-connections approach's stats sync process, the present methods and systems may incorporate a subslotting scheme for improved distribution. A plurality of active services may be placed in subslots corresponding to each PE, while the subslots reside in slots that tracks the number of active connections handled by a particular service. The number of subslots in each slot may be configured to be equal to the number of available PEs. By placing services in different subslots across PEs, distribution skew due to the ordering of services may be avoided or alleviated.

In certain embodiments, each core of the multi-core system may execute or support one packet engine and/or vserver. In other embodiments, a core may support or execute a plurality of vservers and/or packet engines. A packet engine may be associated or assigned with a plurality of slots. Each slot may track, indicate, represent or be otherwise associated with a different number of active connections allocated to a service accessible via the corresponding packet engine. For example, if service S1 is present in slot 2, it may mean that two active connections have been allocated to a service accessible via the corresponding packet engine. In some embodiments, each slot is partitioned or subdivided to comprise a plurality of subslots. The number of subslots in each slot may be the same, and this may be configured to be the same across a plurality of packet engines as well. In certain embodiments, a configuration module or load balancer of the device may configure the number of subslots to correspond to, or be equal to the number of available packet engines executing on the device.

Figure 7B:
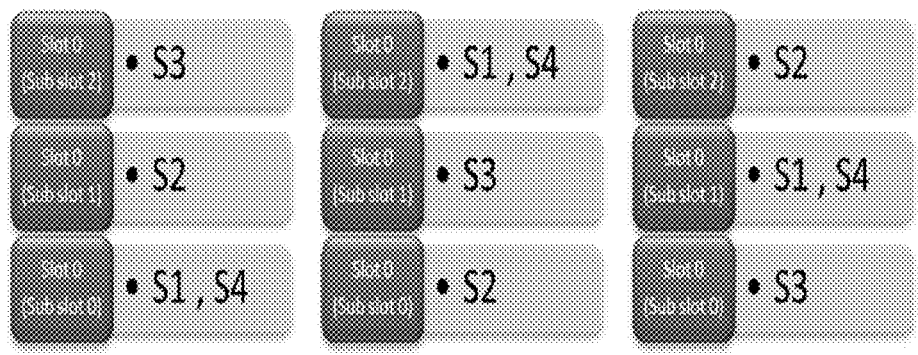
FIGS. 7B-G are embodiments of service and transaction distribution across a plurality of subslots of a plurality of packet engines.

In some embodiments, the multi-core device may have to handle or distribute services when the number of services is not exactly divisible by the number of packet engines executing on the device (Num_PPEs). The multi-core device may distribute the services across a plurality of subslots of each packet engine (and the associated core). If there are no active connections assigned to the services, the services may be distributed to slot 0 of each packet engine. In some embodiments, a plurality of services may be distributed sequentially, one to each subslot. Any remaining services may each be distributed to a different subslot occupied by another service, e.g., pairing of services in a subslot. In some embodiments, more than two services may be distributed to a particular subslot. The pairing or grouping of services in a subslot may be configured such that the same configuration of services (e.g., S1 and S4) are grouped together in one subslot in each packet engine. In certain embodiments, each service (or group of services) may be distributed or assigned to different sub-slots between adjacent packet engines. By way of illustration, FIG. 7B illustrates one embodiment of a service distribution across a plurality of subslots of a plurality of packet engines. For example, four services S1-S4 are divided across a three packet engine system.

Figure 7C:
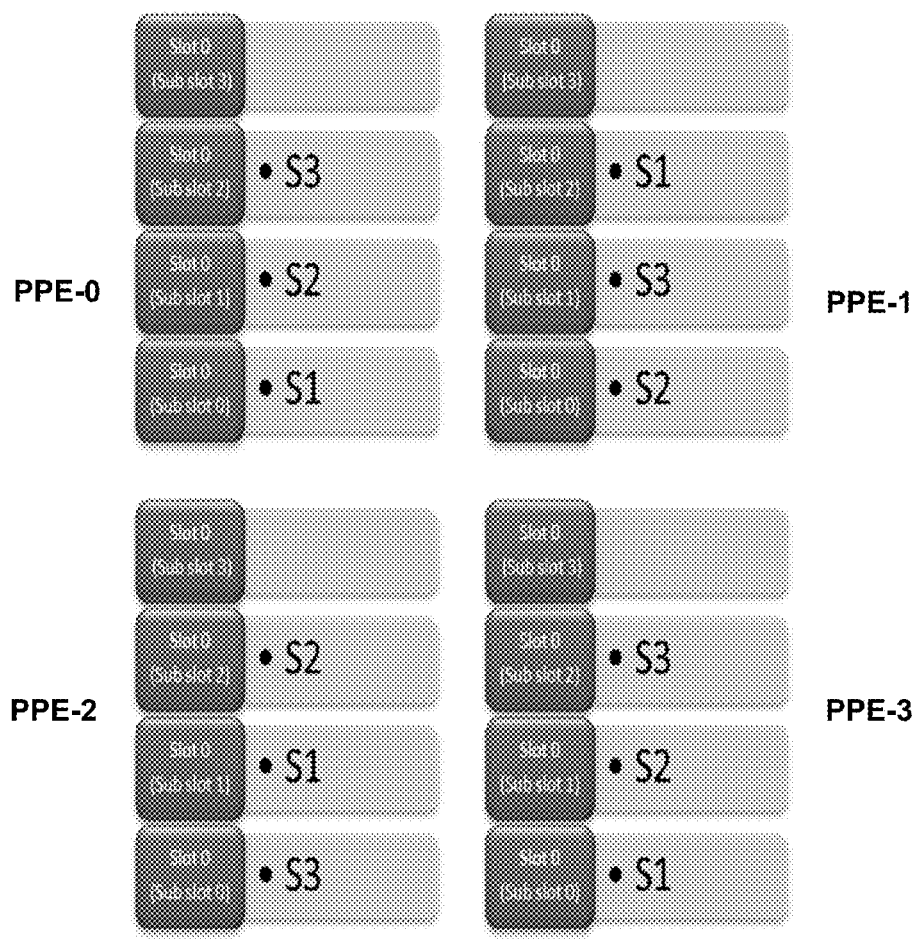

In some embodiments, the multi-core device may have to handle or distribute services when the number of services is less than Num_PPEs. One consideration here is to address distribution of ownership for subslotting so that no biasing should take place. The services may be owned by multiple packet engines (e.g., to avoid biasing). The services may be distributed as in the case where the number of packet engines are equal to the number of services. For example, in some embodiments, the load balancer may configure a number of subslots for each packet engine slot, to be equal to the number of packet engines one the device. By way of illustration, 3 services S1-S3 may be distributed among a system of four packet engines as depicted in FIG. 7C. The services may for example be distributed between a subset of the subslots in each of the packet engines. The subset of subslots may comprise a number of the lowest subslots in each slot. The assignment of each service (e.g., with no active connections or transactions) may be configured such that a service is not assigned to the same subslot between adjacent packet engines.

In some embodiments, for services (such as those provided by Amazon.com) at low traffic rate (e.g., ½ requests per second per service) with time to first byte (TTFB) approximately 800 msec for example, it may be observed that there is uneven load balancing between the services when Least Connections is applied as the load balancing method. TTFB may be used as an indication of the responsiveness of a webserver or other network resources. In some embodiments, services which are added later in the configuration may get more hits than services which are added prior. Recently-added services may receive more incoming parallel requests or connections (e.g., which may maximize up to, or be as high as the number of packet engines, for example, one request per packet engine). Other services might receive a lesser number of parallel requests or connections ranging from (NUM_PPEs−1 to 0).

In certain embodiments, as the number of parallel requests going to a server (e.g., service) increases, the server get more loaded, thereby adding latency on the server's responses. So newly-added services may get over-utilized/loaded, thereby increasing the latency of response on these services. At the same time, some services may operate (e.g., in almost ideal conditions) with 0 to 1 active number of connections, so that load is not evenly distributed across all services. Thus, lately added services may over-utilized/loaded and services that are added earlier may be underutilized. By way of illustration, one embodiment of data logged for a plurality of services showing that lately added services have higher TTFB than services which are added earlier, is depicted below:

AVG TTFBs 21500:

| IP_Address | Hits | Avg_TTFB |
|---|---|---|
| 10.90.154.96 | 854320 | (712 msec) |
| 10.90.179.10 | 882351 | (746 msec) |
| 10.90.142.90 | 854320 | (725 msec) |
| ⋮ | | |
| 10.90.147.141 | 3090350 | (879 msec) |
| 10.90.211.93 | 3108704 | (887 msec) |
| 10.90.150.246 | 3116849 | (878 msec) |

AVG TTFBs 17500:

| IP_Address | Hits | Avg_TTFB |
|---|---|---|
| 10.90.154.95 | 10613 | 618 msec |
| 10.90.154.96 | 10571 | 609 msec |
| 10.90.154.97 | 10724 | 621 msec |
| ⋮ | | |
| 10.90.30.105 | 38700 | 669 msec |
| 10.90.77.159 | 38612 | 668 msec |
| 10.90.249.147 | 38600 | 672 msec |

From the above, it may be observed that the services which are getting more hits have higher TTFB. There may be more hits because lately-added services receive more parallel requests than others at any given point of time.

In some embodiments, certain features for Least Connections processing may be disabled from load balancing. The resulting load balancing may not give preference to any given service and so loads may be more evenly distributed (e.g., no service is over loaded) and the average response time may be reduced as compared to using Least Connections (e.g., when stats consolidation is enabled). In certain embodiments, when there are long lived connections on certain packet engines for any given service, that service may receive more active transactions on other packet engines than another service which does not have long lived connections.

Figure 7D:
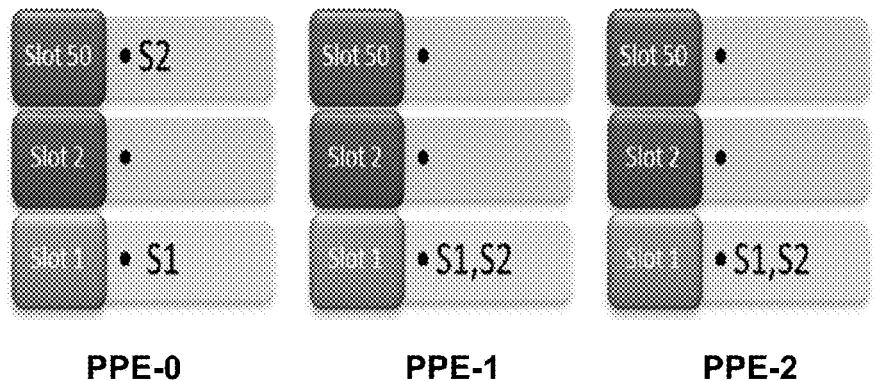

By way of illustration, FIG. 7D depicts one embodiment of a distribution of connections between services across a plurality of packet engines. S2 in PPE-0 may reside or be allocated at slot 50, e.g., S2 has 50 active transactions in PPE-0. S2 may have 0 active connections on the rest of the packet engines whereas S1 has 0 connections on all the packet engines. This condition may happen due to long lived connections, in which there was a time S1 also had 50 connections in PPE-0 but all of them have closed as of now.

If the load balancer sends a new transaction to PPE-1 or PPE-2, it may be allocated to S1, even if it already has 50 active connections whereas S2 has none. This may be due to an unavailability of information about active connections across packet engines as no update may happen during statistics consolidation and each packet engine may be working independently.

In some embodiments, and at low traffic rate, some services may receive preference over others due to a statistics synchronization (stat sync) order along with the use of an averaging approach. This combination of "ordering with average" may be such that services which are added later get almost one incoming parallel request or connection in all the packet engines whereas other services which were added earlier may not get one request/connection on each packet engine. Due to the averaging approach, all services may move to the same next slot during stat sync, thereby giving preference to lately added services. By way of illustration, say there are two services S1 and S2 present on a 7 packet engines system. The services may be added in the order S1 and then S2. Initially there may be no connections, so S1 and S2 may be present in the slot 0 in the order (S2→S1) due to a prior stat sync. If, for example, 9 new requests come in, the first 7 connections may go to each packet engine (e.g., 1 per packet engine) and S2 may be selected on each and every packet engine but S1 will be selected only on PE-0 and PE-1. So after 9 requests: 7 may go to S2 and 2 may go to S1. When stat sync happens, it may place both the services in slot 2 according to:

Active connections=<active Connection on Local packet engine>+(<sum of all the active connections on all other packet engines excluding self)+((Num_PPE−1)−1)/(Num_PPE−1))

The load balancer may determine the absolute value of active transactions on a local packet engine and an average of active connections for the rest of the packet engines (e.g., round off to ceiling). Due to the above logic (e.g., averaging), if a service S2 has 7 connections and S1 has 2 connections in a 7 packet engine system, the load balancer may place S2 in Slot 2 in all the packet engines, and S1 in Slot 2 in PE-0 and PE-1, and S1 in Slot 1 in the rest of the packet engines as shown:

Slot for service S2=1+(6+(6−1))/6=1+1=2.
Slot for service S1=1+(1+(6−1))/6=1+1=2 (For PE-0 and PE-1)
Slot for service S1=0+(2+(6−1))/6=0+1=1 (All except PE-0 and PE-1)

So if the connections are allowed to close (e.g., due to low traffic rate and high TTFB), the services may come back to slot 0 in the same order (S2→S1) (e.g., due to order of the global service list). S2 may keep receiving preference over S1 thereby causing the associated skew.

In some embodiments, stats sync operates or occurs using a global service list (e.g., nssi_static_head). Services may be added to the list in the head of the list, so that the order of the list (e.g., for services to be allocated with active connection) becomes the reverse of the order in which services are added. Now when we do stat sync we also update the Lconn table, so the services that are added most recently may get in front of the list causing the most recently added services to get a higher number of parallel active transactions.

In some embodiments, the load balancer incorporates or executes an algorithm based on subslots. Each slot may be configured to have sub-slots equal to the number of packet engines in the multi-core system. All of the configured (e.g., active or UP) services taking part in the LConn or Least Connections processing may be distributed or divided equally across the sub slots over one or more packet engines.

Figure 7E:
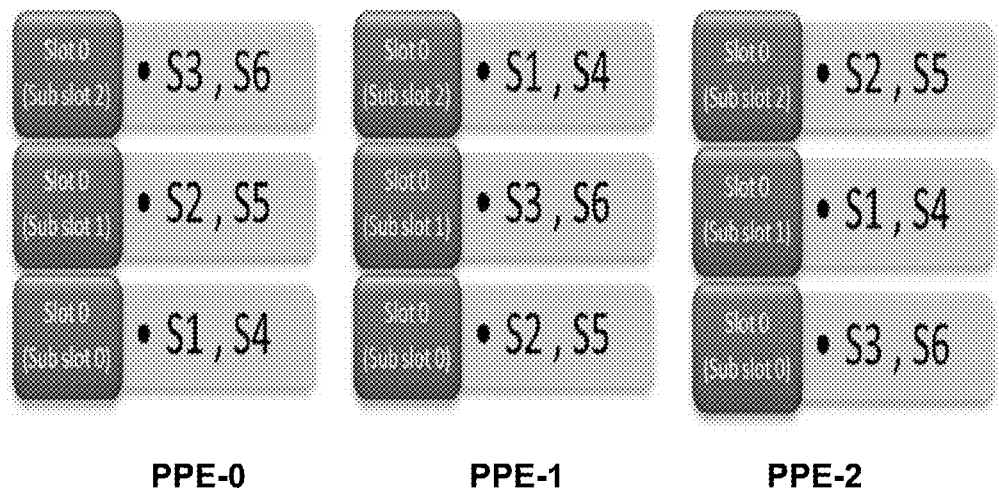

By way of illustration, FIG. 7E depicts one embodiment of a distribution of services across subslots of a plurality of packet engines. For a 3 packet engine system with 6 services S1 to S6, the services may be divided equally among the packet engines, with 2 services in each sub-slot. All of the services are present in the same slot across the packet engines, but allocated to different subslots based on ownership. For example, the same subslots between any two packet engines (e.g., adjacent packet engines) may be allocated with different service(s).

In some embodiments, the number of services may not be exactly divisible by Num_PPEs. In such cases, the services may be distributed as described above in connection with FIG. 7B. In this scheme, positioning of services across the subslots may not provide any preference to allocation of active connections to services. In some embodiments, the number of services may be less than Num_PPEs. In this case, the services may be owned by multiple packet engines, e.g., as discussed above in connection with FIG. 7C.

In each slot, the distribution of services may be based on an active service list. The multi-core device or load balancer may provide and/or maintain the active service list, e.g., based on a determination of active (or UP) services. Since disabled/down services do not take part in LConn or Least Connections processing, such services may not be part of the LConn hash table. Distribution of services may be required whenever a new binding is added to the LConn hash table and/or if an existing binding is removed from the hash table.

The distribution of services may be based on different events. In some embodiments, a binding may be added to a LConn table. For example, a new service may be bound to a vserver of the device, a service may change state to active/UP from any other state, the load balancing method may be set to LConn from any other method. In these cases, when a binding may be add to a LConn table, the load balancer may distribute the services by giving ownership to one packet engine inline in the event. The load balancer may maintain a counter, e.g., sometimes referred to as vsvr_svc_insert_cnt by way of illustration. The packet engines may start the vsvr_svc_insert_cnt at zero and may increment it as new bindings are added to the LConn table. In one illustrative embodiment, the load balancer may determine or find the ownership and slot by the following formula:

```
01.   Owner = vsvr->vsvr_svc_insert_cnt++;
02.
03.   if (vsvr->vsvr_active_svcs >= ns_num_umpes) {
04.     servinfop->subslot_idx = (Owner +
        (ns_num_umpes – local_targetid))%ns_num_umpes;
05.   }
06.   else {
07.     if (vsvr->vsvr_active_svcs > local_targetid)
08.        Offset = (vsvr->vsvr_active_svcs – local_targetid);
09.     else
10.        Offset = ( local_targetid – vsvr->vsvr_active_svcs);
11.
12.   servinfop->subslot_idx =
13.   (Owner + Offset) % vsvr->vsvr_active_svcs;
14.   }
```

In some embodiments, the packet engines begin the vsvr_svc_insert_cnt at zero, and UP/DOWN/Bind/Unbind events may be same on all packet engines, and so the distribution of services is the same. In the case of command failure for example, vsvr_svc_insert_cnt can skew. The device may redistribute ownership during a next stat sync. For example, by setting a Flag (e.g., NS_SUBSLOT_REDISTRIBUTE_ALL) on the associated vserver, redistribution of ownership can take place at the time of the next stat sync. Complete redistribution of binding may happen on all packet engines, so that distribution can become same, and the redistribution may be done on the active service list (e.g., active_svc_list).

Another case or scenario in which stat sync redistribution may take place is when the number of active services is less than the number of packet engines (e.g., identified by the "else" part in the above formula). It may be clearly seen that a change in vsvr→vsvr_active_svcs can change the ownership of all the services, even if the services were distributed before. So if the number of services are less than number of num_PPEs, the load balancer may be configured with the flag NS_SUBSLOT_REDISTRIBUTE_ALL to redistribute services in the next stat sync. To cover other or all cases of skew, the load balancer may check if redistribution is required once every predetermined time period (e.g., 5 sec or so), e.g., within the stat sync itself. In some embodiments, redistribution may not be or include CPU overhead as in the stat sync. Redistribution may include going over all the bindings of the associated vserver and updating the subslot in addition to slots.

The distribution of services may be based on a removal of a binding from a LConn table/list. For example, removal of a binding may occur at the unbinding of a service from an associated vserver, or when a service changes state from active/UP to any other state. In the case of removing a binding from the LConn table, there may not be a need to redistribute the services on every removal. Instead, redistribution may be based on a percentage tolerance and/or a time period. For example, the load balancer may not trigger redistribution until 5% of the existing services/bindings are removed from the LConn table or after 5 sec, whichever happens first. A tolerance variable may be configurable for the sake of flexibility. The redistribution may not be performed inline in the data plane; instead whenever the tolerance limit is hit, a flag (e.g., NS_SUBSLOT_REDISTRIBUTE_ALL) may be set and the redistribution may take place in the next load balancing stat sync.

In some embodiment, a pointer (e.g., vsvr_best_idx) may refer to a subslot location for allocating a transaction or connection. The vsvr_best_idx may start from the sub-slot zero whenever the index or pointer moves to a new slot. The pointer may move to next best subslot when no more services/bindings are available in the sub-slot.

The load balancer may move the pointer and/or distribute services in Round-Robin fashion among sub-slots within the slot. The load balancer may move the pointer to the next slot when no service is present in any of the sub-slot of the given slot. In a worst case scenario, the load balancer may to look for Num_PPE number of indexes (e.g., sub-slots) before going to the next slot.

Figure 7F:
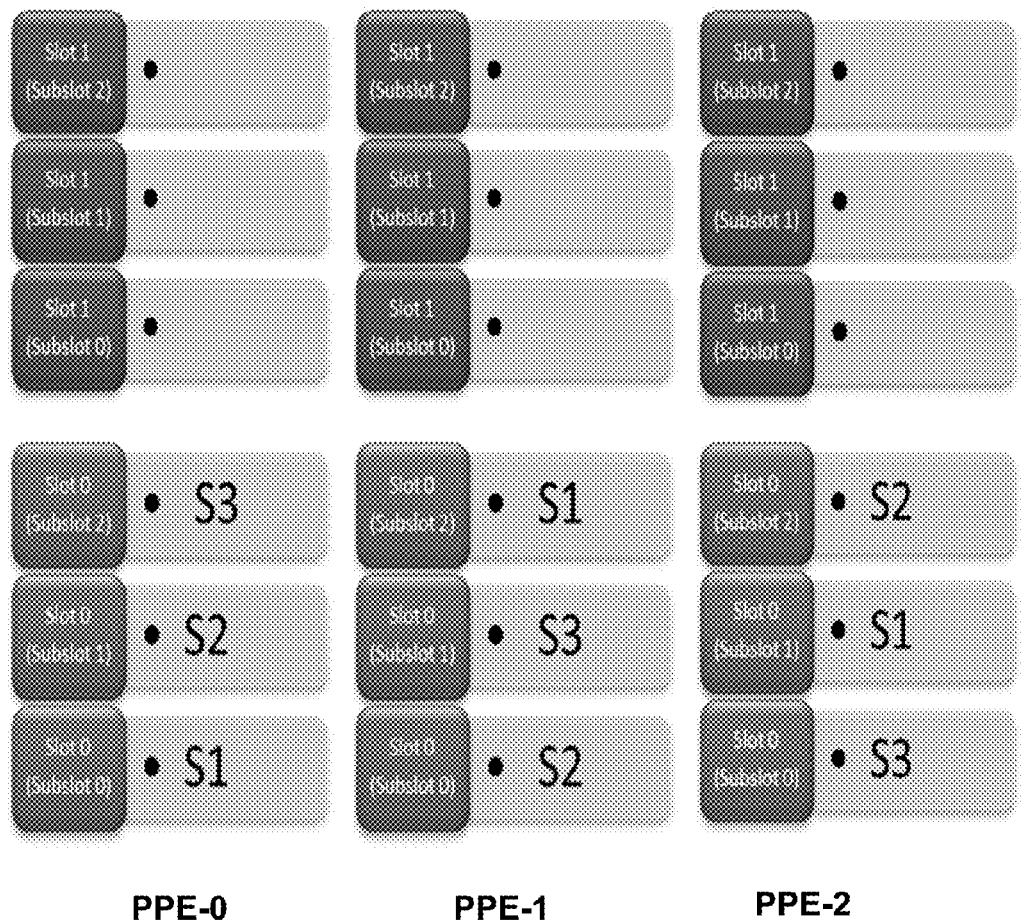

In some embodiments, the services may be assigned or allocated to different slots based on the active number of transactions, although the corresponding subslot may remain same. For Example, consider three services S1-S3 in a 3 packet engine system. All services may have no active transactions, so all the services are present in the slot-0 but in different sub-slots as shown in FIG. 7F. When a service gets a new transaction, the service may move to slot-1 but stay in the sub-slot-0.

Figure 7G:
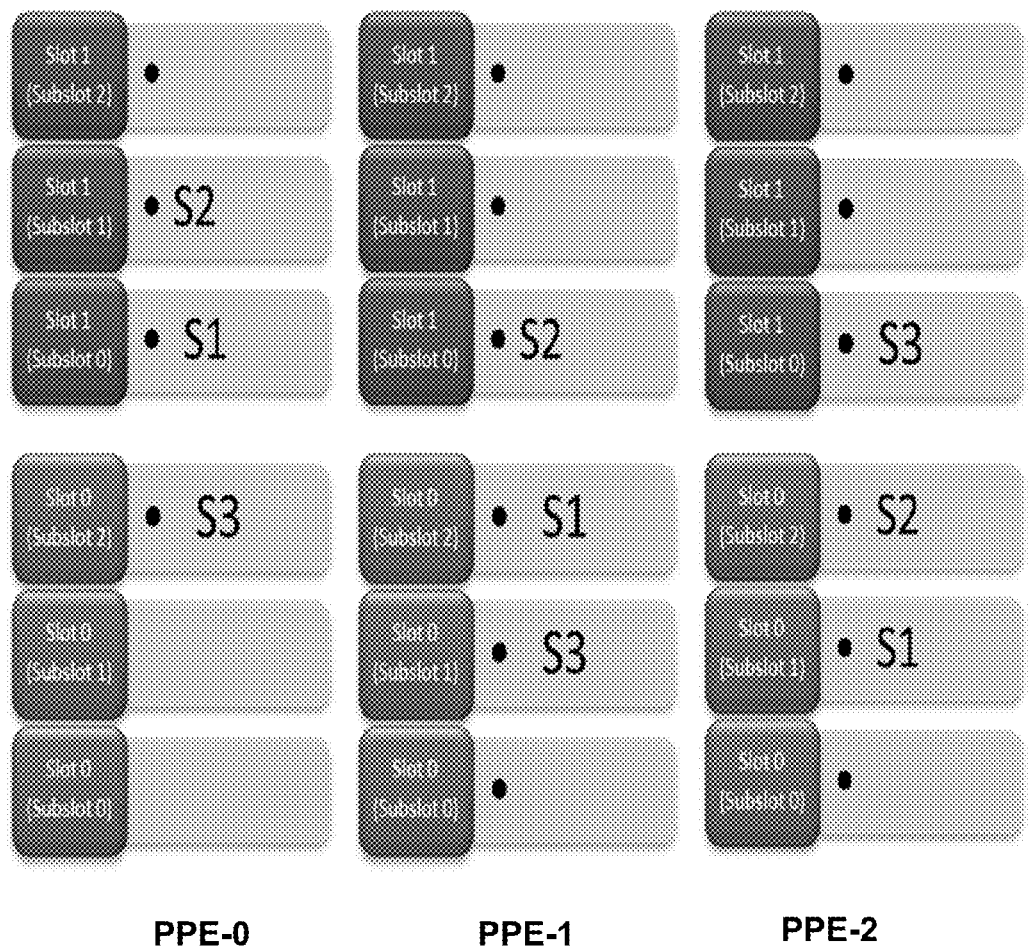

For example, all the services may be (initially) present in slot 0 and in their respective subslots. If 4 transactions came, the first transaction may be taken by S1 in PPE-0. A second transaction may be taken by S2 in PPE-1, a third by S3 in PPE-2 and a forth transaction may be taken by S2 in PPE-0. FIG. 7G depicts the distribution of services incorporating these 4 transactions. As shown, each service stays in the respective subslots determined by the (original) ownership, and corresponding to allocation of a transaction, each service may jump by NUM_PPEs to stay in the same subslot irrespective of the slot.

In some embodiments, service/server selection is based on the service at the head in the pointer/index vsvr_best_idx. vsvr_best_idx may be updated in at least 2 situations: (a) a service is removed from a slot, and (b) a service is enqueued, assigned, allocated or added to a slot. In these situations, the underlying reasons may include connection close, connection open, disable/enable service, load balancing stat sync, etc.

When a service is removed from a slot, vsvr_best_idx may be updated if the slot became empty. The load balancer may search for a next higher slot (e.g., higher number of connections) that has service and may update vsvr_best_idx to it. When service is enqueued to a slot, vsvr_best_idx may be updated if the service is being enqueued to a slot lower (e.g., less number of connections) than vsvr_best_idx.

In some embodiments, instead of a hash table, the load balancer may use or be configured with a LConn list. Using the sub-slot configuration, the load balancer may stop sending traffic to a service on all packet engines if the service was heavily favored on one packet engine (PE) a while back, for example, as shown below:

|      | PE0 | PE1 | PE2 |
|------|-----|-----|-----|
| SVC0 | 241 | 0   | 0   |
| SVC1 | 40  | 41  | 40  |
| SVC2 | 0   | 0   | 20  |

One embodiment of a distribution of services with averaging including the remainder is shown below:

|      | PE0 | PE1 | PE2 |
|------|-----|-----|-----|
| SVC0 | 80  | 81  | 80  |
| SVC1 | 40  | 40  | 41  |
| SVC2 | 7   | 7   | 6   |

Figure 7H:
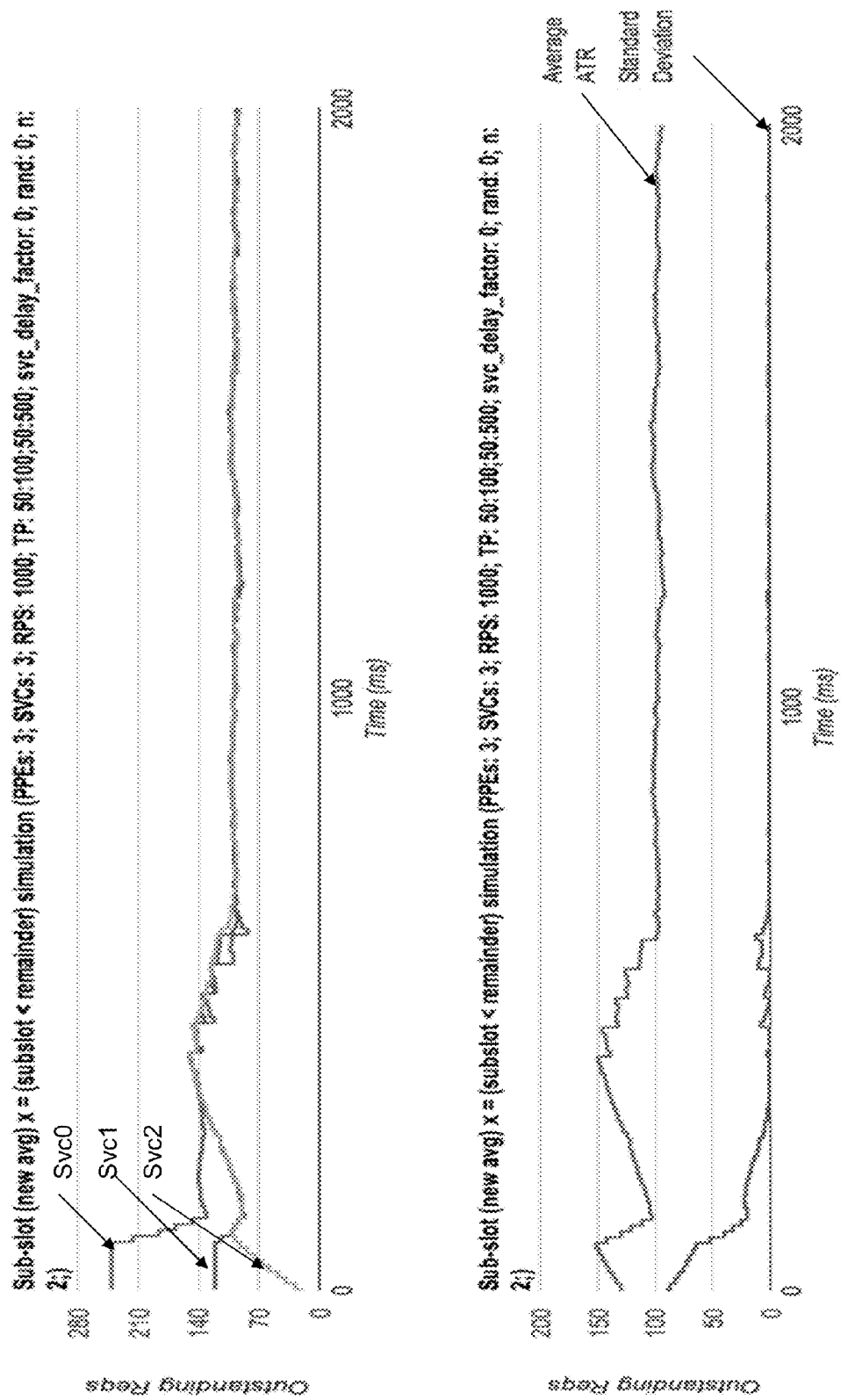
FIG. 7H-I are embodiments of charts depicting active transactions and the corresponding standard deviation.

One embodiment of the corresponding charts depicting active transactions and the corresponding standard deviation is shown in FIG. 7H.

SVC0 may not get any requests from PE1 & PE2 until the balance is corrected. If the skew in traffic continues (e.g., by whatever that caused this situation in the first place), then the system may take longer to converge because the system is only waiting for PE0 to complete its requests. In some embodiments, the system may slightly favor this service on PE1 and PE2 and slow the service down on PE0 (e.g., to converge earlier).

The system may make this adjustment on those PEs where OE (e.g., number of local active connections/transactions) is a big contributor or big drag on the system wide average. For example, on a 7 PE system, if a service's OE is more than 7 away from the average, the system may need corrective action. If the offset from the average is within Num_PPE, no correction may be required. In other words, the system does not just wait for connection closure to correct the imbalance. The system may "transfer" some load on a service from PEs where OE>>AVG to PEs with OE<<AVG. In one illustrative embodiment, for the transfer of load or fine tuning the system may operate according to the following:

```
/* X = 0 or 1 based on remainder distribution */
if (|PE_OE - base_slot| > NUM_PPE) {
    X += (PE_OE - base_slot) / NUM_PPE;
}
``` where, base_slot: Average of all the PEs.
Without this adjustment, the slot chosen may have been:

|      | PE0 | PE1 | PE2 |
|------|-----|-----|-----|
| SVC0 | 80  | 81  | 80  |
| SVC1 | 40  | 40  | 41  |
| SVC2 | 7   | 7   | 6   |

The adjusted slots may be:

|      | PE0 | PE1 | PE2 |
|------|-----|-----|-----|
| SVC0 | 133 | 55  | 54  |
| SVC1 | 40  | 40  | 41  |
| SVC2 | 5   | 5   | 10  |

This adjustment is shown in the graph below. Note that we continue to give SVC0 requests compared to previous sub-slot test (from PEs with OE<AVG). Overall the service may get a slower request rate compared to other services (e.g., to converge).

Figure 7I:
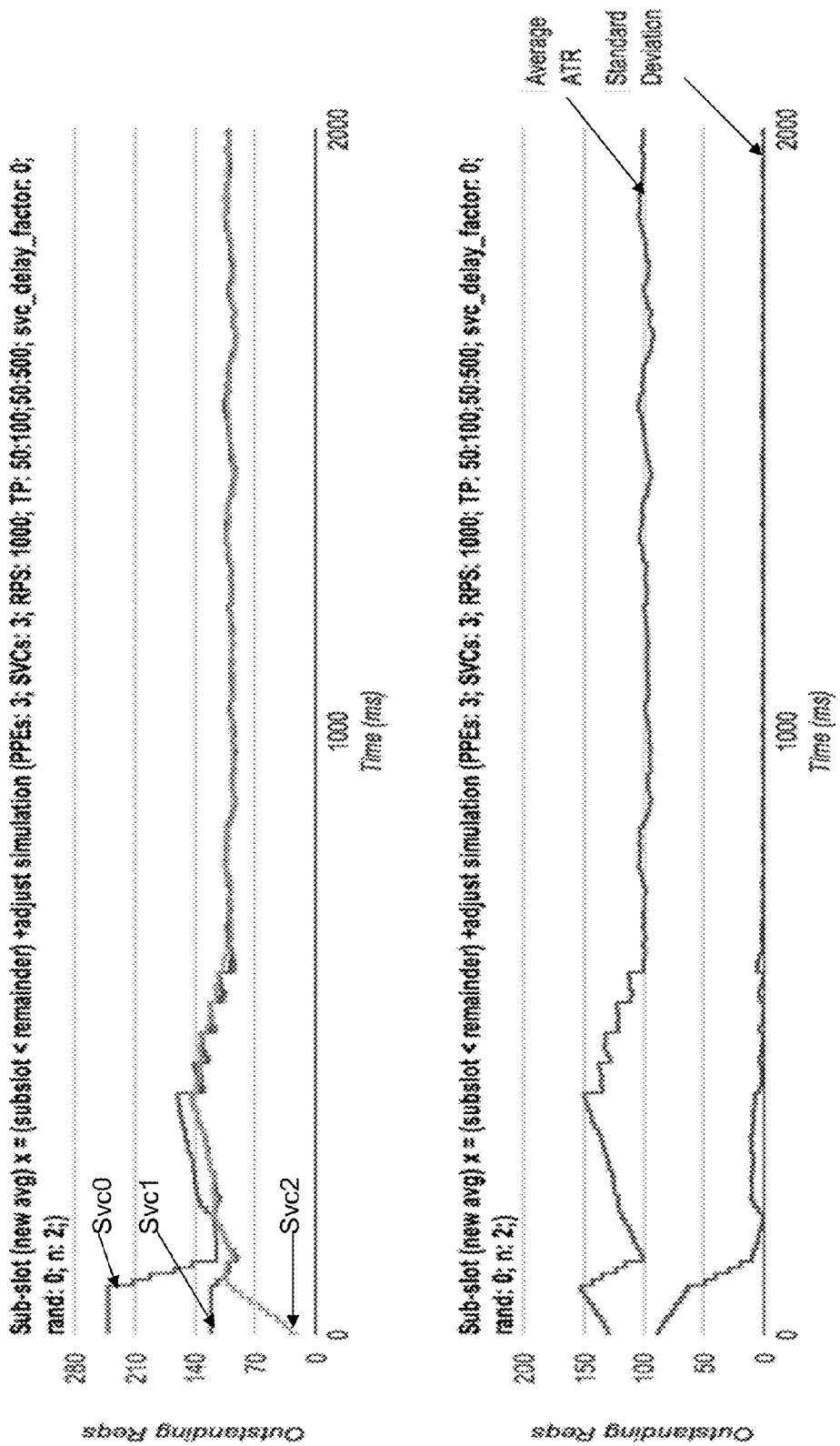

One embodiment of the corresponding charts depicting active transactions and the corresponding standard deviation is shown in FIG. 7I.

In some embodiments, the logic formula comprises the following elements:

$S_i$: Slot for any given service on $i^{th}$ PPE.

$x_i$: Active number of transactions for the given service on $i^{th}$ PPE.

F: un-consolidation factor, Range: $F \in [1, N]$ $$\sum_{All} x_i :$$

Sum of active number of transactions on all the PPEs.

$$\sum_{Oth} x_i :$$

Sum of active number of transactions on all the PPEs except local PPE.

CR: Contribution ratio—the ratio of the weights given to self as compared to contribution from all the other PPEs.

N: Number of PPE in the system.

$$\sum_{All} x_i = \sum_{Oth} x_i + x_i$$

$$\text{Base}_{slot} = \left(\frac{\sum_{All} x_n}{N}\right)$$

Per the algorithm the slot for any given service on $i^{th}$ PPE is:

$$\Rightarrow S_i = \text{base}_{slot} + F * \left[\frac{(x_i - \text{base}_{slot})}{N}\right]$$

$$\Rightarrow S_i = \left(\frac{\sum_{All} x_n}{N}\right) + F * \left[\frac{\left(x_i - \left(\frac{\sum_{All} x_n}{N}\right)\right)}{N}\right]$$

$$\Rightarrow S_i = \left(\frac{\sum_{All} x_n}{N}\right) + \frac{F x_i}{N} - \left(\frac{F \sum_{All} x_n}{N^2}\right)$$

$$\Rightarrow S_i = \left(\frac{\sum_{All} x_n}{N}\right) + \frac{F x_i}{N} - \left(\frac{F \sum_{All} x_n}{N^2}\right)$$

$$\Rightarrow S_i = \frac{F x_i}{N} + \left(\frac{\sum_{All} x_n}{N}\right)\left(1 - \frac{F}{N}\right)$$

$$\Rightarrow S_i = \frac{F x_i}{N} + \left(\frac{\sum_{Oth} x_i + x_i}{N}\right)\left(1 - \frac{F}{N}\right)$$

-continued $$\Rightarrow S_i = \frac{x_i}{N}\left(F + 1 - \frac{F}{N}\right) + \left(\frac{\sum_{Oth} x_i}{N}\right)\left(1 - \frac{F}{N}\right)$$

$$\Rightarrow S_i = \frac{x_i}{N}\left((F + 1) - \frac{F}{N}\right) + \left(\frac{\sum_{Oth} x_i}{N}\right)\left(1 - \frac{F}{N}\right)$$

$$S_i = \frac{x_i}{N}\left((F + 1) - \frac{F}{N}\right) + \left(\frac{\sum_{Oth} x_i}{N}\right)\left(1 - \frac{F}{N}\right)$$

$$S_i = \frac{\text{(Self Contribution to Slot)}}{N}\left((F + 1) - \frac{F}{N}\right) + \frac{\text{(Others Contribution to Slot)}}{N}\left(1 - \frac{F}{N}\right)$$

The above equation can be used to show the amount of weight given to self contribution of active connection to the slot, and also how much comes from other PEs. Comparing the above equation with and without tuning:

$$\Rightarrow S_i = \text{base}_{slot}$$

$$\Rightarrow S_i = \left(\frac{\sum_{All} x_n}{N}\right)$$

$$\Rightarrow S_i = \frac{x_i}{N} + \left(\frac{\sum_{Oth} x_i}{N}\right)$$

Comparison:

$$S_{i(without\ tuning)} = 1 * \left(\frac{x_i}{N}\right) + 1 * \left(\frac{\sum_{Oth} x_i}{N}\right)$$

$$S_{i(with\ tuning)} = \frac{x_i}{N}\left((F + 1) - \frac{F}{N}\right) + \left(\frac{\sum_{Oth} x_i}{N}\right)\left(1 - \frac{F}{N}\right)$$

Without tuning: Equal weight is given to both local active transaction and contribution from all the other PPE both 1

$$CR_{withoutTuning} = \frac{1}{1} = 1$$

With tuning: Weight from the local is $$\left((F + 1) - \frac{F}{N}\right)$$

and for all the other PPEs contribution is $$\left(1 - \frac{F}{N}\right).$$

$$CR_{withTuning} = \frac{\left((F+1) - \frac{F}{N}\right)}{\left(1 - \frac{F}{N}\right)}$$

Comparing with different values of $F \in \lceil 1, N \rceil$:

| F | CR |
|---|---|
| 0 | $CR_{withTuning} = \frac{\left((0+1) - \frac{0}{N}\right)}{\left(1 - \frac{0}{N}\right)} = 1$ (same as without tuning) [Full Consolidation] |
| 1 | $CR_{withTuning} = \frac{\left((1+1) - \frac{1}{N}\right)}{\left(1 - \frac{1}{N}\right)} = \frac{\left(2 - \frac{1}{N}\right)}{\left(1 - \frac{1}{N}\right)} = \frac{(2N-1)}{(N-1)}$ For N = 2, $CR_{withTuning} = 3$ For N = 11, $CR_{withTuning} = \frac{21}{10} = 2.1$ For N = ∞, $CR_{withTuning} = \frac{2}{1} = 2$ So for the factor F = 1, the system may give 3-2 times more weight to local active transactions than the contribution of all the other PEs. |
| 2 | $CR_{withTuning} = \frac{\left((2+1) - \frac{2}{N}\right)}{\left(1 - \frac{2}{N}\right)} = \frac{(3N-2)}{(N-2)}$ For N = 2, $CR_{withTuning} = \frac{4}{1} = 4$ For N = 11, $CR_{withTuning} = \frac{31}{9} = 3.4$ For N = ∞, $CR_{withTuning} = \frac{2}{1} = 3$ So for the factor F = 2, the system may give 4-3 times more weight to local active transactions than the contribution of all the other PEs. |
| N | $CR_{withTuning} = \frac{\left((N+1) - \frac{N}{N}\right)}{\left(1 - \frac{N}{N}\right)} = \frac{N}{(0)} = \infty$ |

The $CR_{withtuning} = \infty$, since contribution is taken from local only and no contribution from other PEs. This may be referred to as the unconsolidated case. Consolidation may be advantageous over unconsolidated for certain situations and visa-versa. Accordingly, the levels of adjustment (on F) provided above can provide a way to get benefits from both the approaches by deciding to what extent consolidation is required. This may be performed by varying the value of factor F. This option can allow for control of the extent of consolidation required.

In some embodiments, vsver_best_idx may represent a subslot index. The best slot for service selection may be pointed by the head of the LConn list. In certain embodiments, when a service is enqueued or added to a slot, the load balancer may operate according to the following:

Is the service being added into the head slot?
  If YES: Is this the first service in the slot (e.g., has a new slot has been created)?
    If YES: Then set the subslot index to subslot in which service has been added (e.g., in the newly created slot).
    If NO: No change.
  If NO: No change.

In some embodiments, when a service is removed from a slot, the load balancer may operate according to the following:

Is the service removed from the head slot of the Lconn list?
  If YES: Is this the last service in the subslot ?
    If YES: Update the subslot index to next available subslot by looking across subslots (e.g., may check up to Num_PPE pointers).
      Found any subslot within the slot?
        If YES: Update the subslot index to it.
        If NO: Jump to the next Slot in the LConn list, and starting from subslot zero find the first non-empty subslot traversing upwards, and set the index to it.
    If NO: No Change.
  If NO: No Change.

The sub-slotting configuration/implementation may ensure that each packet engine should not select the same service (e.g., except in exceptional cases) for distribution of transactions/connections, such that ordering (e.g., of services) does not impact the distribution with the sub-slotting approach.

By way of illustration, and in some embodiments employing the sub slotting approach, there may be 9 incoming connections for a vsersver in a 7 packet engine system, with two services S1 and S2. The first 7 connections may be given to each of the 7 packet engines. S1 may be selected on PE-0, PE-2, PE-4, PE-6. S2 may be selected on PE-1, PE-3, PE-5. For the two remaining connections, S2 may be selected on PE-0 and S1 may be selected on PE-1. In this case, S1 has 5 active connections and S2 has 4. Each of the connections may be placed in slot 2. When all the connections close, the services can return to slot 0, but may be placed in different sub-slots in slot 0. The order of services may not matter, as services are be placed in different sub-slots and round robin allocation of connections can be followed when new connections arrive. Thus, sub-slotting can effectively eliminate the ordering issue.

In some embodiments, distribution or ordering issues may be address using a plain offset approach. According to this approach, services may be put in different slots in different PEs. In this approach, services may be placed in different slots due to offset, whereas in the "subslotting approach", services may be placed in the same slot, but across different subslots within the slot. For example, the load balancer may place serviced in different slots based on an ownership model so that each packet engine does not select or over-subscribe to the same service.

By way of illustration, and in one embodiment, if a service Sx is owned by PE2 on a 7 PE system and has 4 current connections, Sx may be placed in the following buckets based on an offset:

| PE_ID | 0 | 1 | 2 | 3 | 4 | 5 | 6 |
|---|---|---|---|---|---|---|---|
| OFFSET | 5 | 6 | 0 | 1 | 2 | 3 | 4 |
| BUCKET | 9 | 10 | 4 | 5 | 6 | 7 | 8 | where, for example, offset=(NS_NUM_UMPE−OWNER_ID+PE_ID) % NS_NUM_UMPE

On each PE, when Sx gets a request, its bucket may be advanced by the OFFSET number. Whenever a connection is closed, the next allocation position may be moved up by the OFFSET number. This helps to maintain a skew during runtime. In other embodiments, an offset of 1 and/or NUM_PE may be implemented run-time. A offset of 1 for allocation positions may eventually have the lists converge leading to distribution/ordering problem(s). By establishing and continuing to increase the skew, the system can incorporate different implicit weights associated with services.

Some of the differences between the plain offset approach and the subslot approach includes:

(1) For a 7 PE system, when an owned service gets a connection, the connection is placed in slot+1 in the plain offset approach. The connection may be placed in subslot+7 in the subslot approach (owned or unowned). The subslot approach can allow least connections distribution to prevail, but may create a bias within the bounds of services having the same number of connections. In the offset approach, when an owned service gets one connection, the load balancer can move an allocation pointer by +1 and place the connection in that slot, so it may now compete with a service that has does not have any connection. For Example, a service S1 that has 7 connections may be competing with a s2 that has 0 connections (e.g., assuming a 7 packet engine system). One rationale is that since other packet engines are operating in the same way, overall the distribution should average out. However, the offset approach may rely more on RSS uniformity and may not prevail as well on low volume traffic. The subslot approach may allow LConn to prevail and also avoid the problem of all packet engines picking the same service. With the subslot approach, once an owned service receives one connection, the service may be placed in a higher slot (e.g., sort of like a+7 offset on a 7 packet engine system) such that it does not have to compete until all the other services also have a connection. The order in which the services receives connections may vary and thus solves the "all packet engines opening connections to same service" issue but allow Least Connections processing to prevail. The subslot approach can rely less on volume of traffic and RSS uniformity, relative to the offset approach.

In some embodiments of a subslot approach, each slot is subdivided into Num_PPE number of sub-slots. When active connections increase or decrease, the main slot may be decide using the least connections algorithm. Upon determining the main slot, the load balancer may place an incoming connection in a subslot depending upon the packet engine that owns it. For example, in the offset approach and a 7 packet engine system, assume for services S1,S2,S3,S4,S5,S6,S7, preference is PPE-0, PPE-1, PPE-2 and so on respectively. For connections coming to PPE-0 (e.g., assuming that no connections terminate), the connections' order of allocation may be: S1,S2,S1,S3,S1,S4,S2,S1,S5 and so forth. With the sub-slottng scheme, the order of connections may be S1, S2,S3, S4,S5,S6,S7,S1, resulting in more uniform but yet solves the above issues.

In some embodiments, the maximum number of supported connections (e.g., maxclient) is determined by dividing a predetermined (e.g., numerical) limit of connections equally (e.g., assume an all exclusive mode). If the limit is 140 and there are 7 PEs, a quota of 20 may be given to each PE. If we take the approach of jumping by offset, the quotas may be underutilized on some PEs which results in less preference to certain services. This can cause under utilization on some packet engines while the owner could have SQ (e.g., allocations) building up. This issue may be avoided in the "sub slot" approach. In at least some embodiments, the subslotting approach can handle ranges and top slots well, which the offsetting approach may not.

In certain embodiments, the load balancer may incorporate a Random selection with a Range List Approach. When connections close randomly, connections may be opened randomly. This approach may assume that at configuration time (e.g., during a configuration window), there is a contiguous array of bound services (e.g., instead of a traditional linked list). This approach may incorporate simple forward averaging during LB stat sync, and may assign that average value to all packet engines. Another assumption may be that RSS would distribute traffic optimally. For example, in a 3 packet engine system with 10 Services, an array of server_info pointers may look like:

| S1 | S2 | S3 | S4 | S5 | S6 | S7 | S8 | S9 | S10 |
|----|----|----|----|----|----|----|----|----|-----|

The system can reuse 2 server_info structure variables. A pointer to the bucket can be reused to remember the array index it is currently residing in. A pointer to the next server_info in the bucket can point to a node in a doubly linked list, as explained below. Each element in the array of server_info pointers may point to a node in a doubly linked list. Each node in the doubly linked list may look like the following:

| Value indicating the range delta from the pervious node | Value indicating the index where this range starts in the array |
|---|---|
| *next | |
| *prev | |

To begin with, the doubly linked-list may look like the following:

| 0 | 1 |
|---|---|
| self | self |

This may indicate that there a range that starts from index '0' and the services from this index have a OE connection count which is '1' greater than the servers below index '0' (e.g., the lower bound for the current ranges that exists). By way of illustration, consider the following distribution example:

PPE-0

| S1 | S2 | S3 | S4 | S5 | S6 | S7 | S8 | S9 | S10 |
|----|----|----|----|----|----|----|----|----|-----|
| &(1,0) | &(1,0) | &(1,0) | &(1,0) | &(1,0) | &(1,0) | &(1,0) | &(1,0) | &(1,0) | &(1,0) |

PPE-1

| S1 | S2 | S3 | S4 | S5 | S6 | S7 | S8 | S9 | S10 |
|----|----|----|----|----|----|----|----|----|-----|
| &(1,0) | &(1,0) | &(1,0) | &(1,0) | &(1,0) | &(1,0) | &(1,0) | &(1,0) | &(1,0) | &(1,0) |

PPE-2

| S1 | S2 | S3 | S4 | S5 | S6 | S7 | S8 | S9 | S10 |
|---|---|---|---|---|---|---|---|---|---|
| &(1,0) | &(1,0) | &(1,0) | &(1,0) | &(1,0) | &(1,0) | &(1,0) | &(1,0) | &(1,0) | &(1,0) |

Now:
1. PPE-0 gets 3 requests and the system randomly picks up S1, S4, S7
2. PPE-1 gets 3 requests and the system randomly picks up S3, S4, S8
3. PPE-2 gets 3 requests and the system randomly picks up S9, S7, S4

The load balancer may select according to the following method (e.g., should not be 0):
1. index=random-number % service_count;
2. swap svc[index] with svc[service_count−1]

3. To begin with, 'service_count' for a Doubly Linked List with a single node may mean the number of services that are bound to this vserver. Later, as nodes get added, the system can get this count by subtracting the index from which the next range begins with the index of the current range.

After the selection, the distribution may look like the following. For each packet engine, the step by step progression of the creation of the range list is shown.

PPE-0

| S10 | S2 | S3 | S9 | S5 | S6 | S8 | S7 | S4 | S1 |
|---|---|---|---|---|---|---|---|---|---|
| &(1,0) | &(1,0) | &(1,0) | &(1,0) | &(1,0) | &(1,0) | &(1,0) | &(1,7) | &(1,7) | &(1,7) |

PPE-1

| S1 | S2 | S10 | S9 | S5 | S6 | S7 | S8 | S4 | S3 |
|---|---|---|---|---|---|---|---|---|---|
| &(1,0) | &(1,0) | &(1,0) | &(1,0) | &(1,0) | &(1,0) | &(1,0) | &(1,7) | &(1,7) | &(1,7) |

PPE-2

| S1 | S2 | S3 | S10 | S5 | S6 | S8 | S7 | S4 | S9 |
|---|---|---|---|---|---|---|---|---|---|
| &(1,0) | &(1,0) | &(1,0) | &(1,0) | &(1,0) | &(1,0) | &(1,0) | &(1,7) | &(1,7) | &(1,7) |

In some embodiments, the load balancer may handle random connection closing as illustrated below:
  a. If S1 closes connection on PPE-0
    i. In O(1) you can obtain the range-list S1 is part of
    ii. Swap it with the service present at index 7, e.g., S7 and update the value of the range node to (1,8)
  b. If S8 closes connection on PPE-1
    i. In O(1) you can obtain the range-list S8 is part of
    ii. Swap it with the service present at index 7, e.g., S8 and update the value of the range node to (1,8)
  c. If S4 closes connection on PPE-2
    i. In O(1) you can obtain the range-list that S4 is part of
    ii. Swap it with the service present at index 7, e.g., S7, and update the value of the range node to (1,8)

PPE-0

| S10 | S2 | S3 | S9 | S5 | S6 | S8 | S1 | S4 | S7 |
|---|---|---|---|---|---|---|---|---|---|
| &(1,0) | &(1,0) | &(1,0) | &(1,0) | &(1,0) | &(1,0) | &(1,0) | &(1,0) | &(1,8) | &(1,8) |

PPE-1

| S1 | S2 | S10 | S9 | S5 | S6 | S7 | S8 | S4 | S3 |
|---|---|---|---|---|---|---|---|---|---|
| &(1,0) | &(1,0) | &(1,0) | &(1,0) | &(1,0) | &(1,0) | &(1,0) | &(1,0) | &(1,8) | &(1,8) |

PPE-2

| S1 | S2 | S3 | S10 | S5 | S6 | S8 | S4 | S7 | S9 |
|---|---|---|---|---|---|---|---|---|---|
| &(1,0) | &(1,0) | &(1,0) | &(1,0) | &(1,0) | &(1,0) | &(1,0) | &(1,0) | &(1,8) | &(1,8) |

In some embodiments, the sub-slot approach may be preferred over this approach because (i) the subslot approach may be more deterministic, easier to debug and provide more confidence in performing Round Robin allocations, and (ii) relatively lower CPU and memory overhead whenever a service is flipping state due to monitoring, and/or less of a need to allocate the different size arrays and to perform bcopy.

In some embodiments, the sub-slot approach is incorporated to address a potential problem of deviation missed due to averaging. At the time of LB stat sync, the following formula may be applied:

Active connections=<active Connection on Local PE>+(<sum of all the active connections on all other packet engines excluding self)+((Num_PPE−1)−1)/(Num_PPE−1))

The load balancer may take the absolute value of active transactions on a local packet engine and the average of active connection for the rest of the packet engines (e.g., round off to ceiling). Due to above logic (e.g., averaging), if a service S1 has 2 connections and S2 has 6 connections in a 7 packet engine system, both the services may be placed in Slot 2 as shown:

Slot for service S1=1+(1+(6−1))/6=1+1=2.

Slot for service S2=1+(5+(6−1))/6=1+1=2.

As both the services are in same slot 2, both services may be given equal preference for any incoming request (e.g., ignoring the fact that S2 may be given less preference than S1, as S2 already has more active connections).

By incorporating a Complete Averaging solution, the load balancer may apply the following formula:

Total Average=<sum of all the active connections on all other PPEs>/<Num_PPE>

By way of illustration, if a service S1 has 2 connections and S2 has 6 connections in a 7 packet engine system, then Average S1=2/7=0

Average S2=6/7=0

Both services may be put in the slot 0 and may be given equal preference because the remainder has been ignored. Ideally, S1 should be preferred more than S2 for new incoming connections as S2 already has a higher number of active connections/transactions.

In some embodiments, the load balancer may use or incorporate a remainder distribution approach for allocation of connections or transactions. In one embodiment, the load balancer may always distribute the remainder from PPE-0. The logic here is to take care of the remainder and distribute the remainder to packet engines starting from PPE-0, giving one count to each PE.

X=(ppe_id<((total % num_ppes)))//Offset can be 1 or zero

Consider a scenario in which a service S1 has 2 connections and S2 has 6 connections in 7 packet engine system. The slot to be allocated with an incoming connection may be determined as Average+X:

Average S1=2/7=0

Average S2=6/7=0 slot of S=Average+(ppe_id<((total % num_ppes))

Figure 7J:
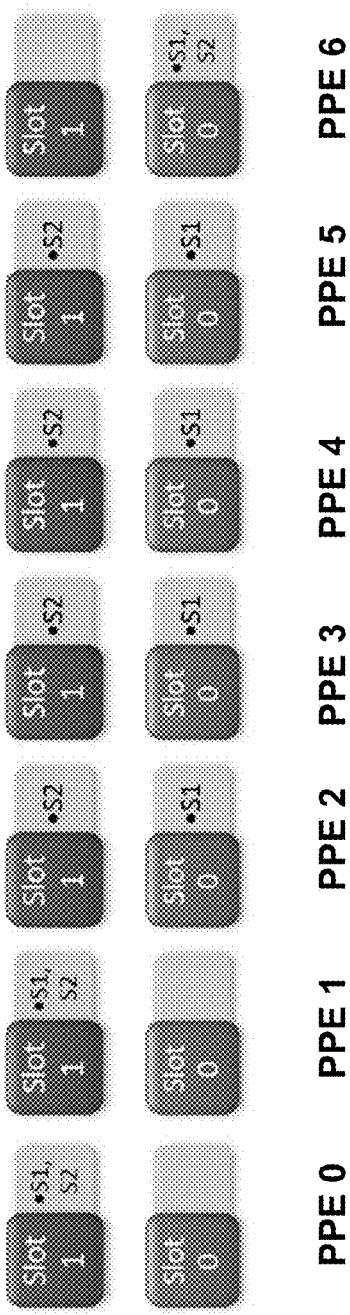
FIGS. 7J-L are other embodiments of service and transaction distribution across a plurality of subslots of a plurality of packet engines.
Figure 7K:
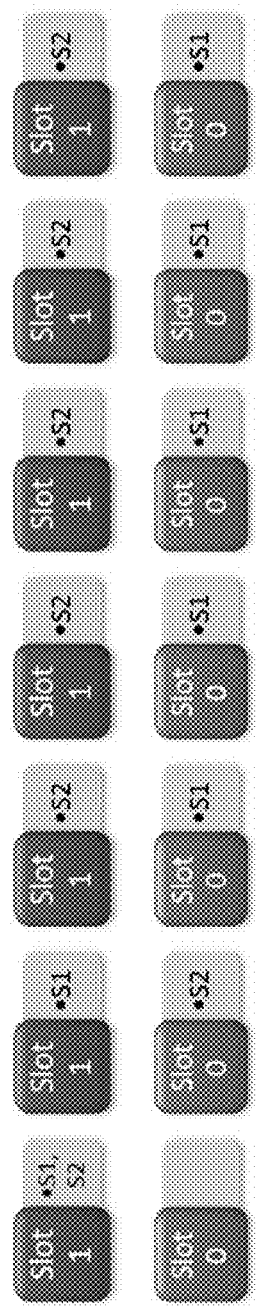

In the above approach, S1 may be preferred in (PPE-2 to PPE-5) 4 packet engines ver S2, which may be expected as per their active counts. FIG. 7J depicts one embodiment of the distribution of incoming connections using the remainder distribution approach. In another embodiment, the load balancer may distribute remainder from Owner packet engine. The logic here is to take care of the remainder and distribute the remainder to packet engines starting from Owner packet engine instead of PPE-0. By way of illustration, assume PPE-0 is the owner of S1 and PPE-2 is owner of S2. FIG. 7K depicts one embodiment of the distribution of incoming connections using the approach of distributing remainder from owner packet engine.

In certain embodiments, the load balancer may distribute remainder to PEs whose OE>Average. This approach (e.g., incomplete averaging) may operate to take care of the remainder and distribute the remainder to those packet engines which has Number of local active connections/transactions greater than Average. By way of example, consider a 7 packet engine system as above with following as active number of connections:

S1={6,0,0,0,0,0,0}//OEs

S2={1,0,0,0,0,0,0}//OEs

Average S1=6/7=0

Average S2=1/7=0

Figure 7L:
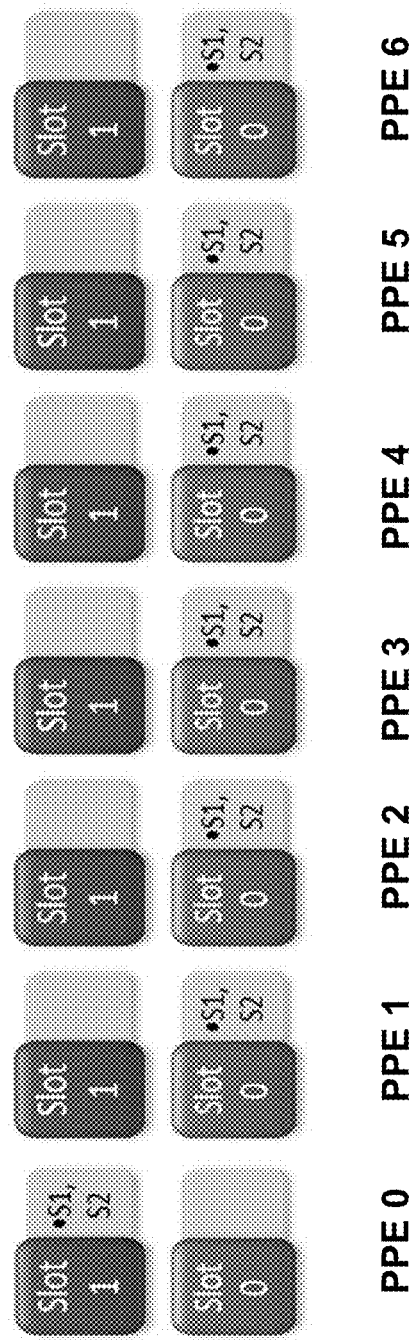

For both S1 and S2 service only PPE-0 is having OE>Average. This is illustrated in FIG. 7L, which depicts one embodiment of the distribution of incoming connections using the approach to distribute remainder to PEs whose OE>Average. In this example, the approach may not be able to give preference to S2 as S2 has a lower total connection count. This is because it has lost the remainder.

The design and/or incorporation of averaging at the time of stat sync may avoid thrashing, e.g., in the allocation of connections to services. Thrashing issue may happen or become significant at higher traffic rate. Thrashing may not be a cause in the distribution/allocation problems as discussed above in the Amazon case, which occur at low rate(s).

By way of illustration, thrashing may happen at high traffic rate as shown in the following example (e.g., without averaging). Consider a case of a vserver with 2 services svc1 and svc2 bound to the vserver, in a 7 packet engine system. All the PEs may select or pickup the first service svc1 and hand over the 7 connections (1 per packet engine). At the time of stat sync, the load balancer may detect that the first service, svc1, has 7 connections and therefore all packet engines (e.g., assuming no averaging) may put that service in the 7th slot. In the next 100 ms for example, the second service svc2 may be overwhelmed since all packet engines may keep selecting it until it has 7 connections in each slot or PE, thereby causing the service to receive 49 connections in total. When the stat sync does happen, svc2 may go to 49$^{th}$ bucket. For the next time period (e.g., 100 ms), svc1 may be overwhelmed since it can get (49−7)*num_ppe=294 connections in the worst case before svc2 is considered for selection again. By using averaging, the load balancer may in effect configure the slots to represent ranges of connections (e.g., first slot representing 0-6, second representing 7-13 and so on).

As discussed above, the next service can get thrashed by num_ppe times, if average is not used. In some embodiments, the load balancer may take an average of the rest of the packet engines only, which may reduce the threshing factor to 2 instead of num_ppe. Some loss in resolution may occur but distribution should average out overall. Here, because of the averaging fix, the system may allow num_ppe number of difference in connections to remain in the same bucket. When combined with the biasing due to stat sync order, the overall configuration may lead to a skew in hits.

In certain embodiments, the formula for averaging is as follows:

Active connections=<active Connection on Local PE>+(<sum of all the active connections on all other packet engines excluding self)+((Num_PPE−1)−1)/(Num_PPE−1))

In an example in which service svc1 is selected on each packet engine, and applying the above formula, svc1 may move to the 2$^{nd}$ Slot, determined by:

Slot for service svc1=1+(6+(6−1))/6=1+1=2.

In this case, the service svc2 may get selected two times on each packet engine (total of 14 connections against 7 for the svc1) instead of num_ppe (without any average). Thus, this approach for averaging can reduce the thrashing may not completely remove it.

Referring again to the approach of complete averaging, the load balancer may take a full average during stat sync rather than an average of other packet engines, such that the factor of 2 discussed above may not happen. In this approach, the slot may be determined at the time of insertion in the LConn list (e.g., due to binding Or state going UP) or stat sync, as:

Base_slot=(Total Active transactions on all packet engines including self)/NUM_PPE old_slot=Current Slot before the recalculation is done.

The base_slot may be bookmarked and maintained till a next stat sync happens. In some embodiments, the packet engine may move the binding/service in the hash table by using the following algorithm:

On every connection open/close: perform the following:

```
x = (connections opened − connections closed)
    within the stat sync time.
if ((base_slot + x) >= 0)
{
    slot = base_slot + x;
    <En-Queue tail of the slot (base_slot + x)>;
}
else {
    slot = 0;
        if (connection_opened) {
            <En-Queue the svc at the tail of the same slot >;
        }
}
```

The service may be placed in the slot provided by the variable 'slot' in the above algorithm. In the algorithm, when a connection is closed, decrement x by 1. When a connection opens, increment x by 1, but do not go in the negative index as shown above. The above approach may ensure that the service is not overwhelmed or threshed. Using the same example where there is a thrashing factor of 2, say svc1 get 1 connection on each PE. As the base_slot maybe at zero, initially the service is placed in the first slot (x 0→1). After the stat_sync, svc1's base_slot may become 1. When the traffic comes, it may be allocated to svc2 since svc2 is sitting on slot 0. The service svc2 may get only 1 connection on each PEE, before svc1 starts taking traffic again at slot 1. Thus, both the services svc1 and svc2 may be on slot 1 with an equal number of active transaction, so that the thrashing factor may be removed.

In some embodiments, the load balancer may use or incorporate a Full Averaging Approach with weights and remainder. This approach may be based on the following embodiment of definitions, formulas/equations and algorithm:

```
total : total number of connections for a service on the multi-core device at
    stats sync.
JF: Jump factor specified as (100/weight) which may be stored as
    serv_incr_val.
x = (offset + connection opened (after last stats sync) − connections closed
    (e.g., after last stats sync)
num_ppe: Number of packet engines in the system.
Old_slot: Current slot in which service is present before calculation is
    done.
Subslot_idx: Subslot index in which the service is present.
base_slot = ((total)*JF)/(num_ppes); [Doing the flooring]
remainder = ((total % num_ppes));
/* Offset will be 1 or zero */
x += (remainder && subslot_idx && (subslot_idx < ((total %
    num_ppes)))
if ((base_slot + (JF * x)) >= 0)
{
    slot = base_slot + (x * JF);
    <En-Queue the service at the tail of the new slot>;
}
else
{
    slot = 0;
    if (connection_opened) {
        <En-Queue the service at the tail of the same slot >;
    }
}
```

In some embodiments, the Full Averaging Approach may include one or more of the following steps.
1) At the time of adding of the binding to the LConn table (e.g., binding of new service to vserver, or when a service changes state to UP/active from any other state, or when the load balancing method is set to Least Connection from any other method):
  a) Calculate base_slot:

servinfop→serv_cur_vbaseidx=((total)*JF)/(num_ppes);

where:

total=(sip→si_cur_actv_trans+ sip→si_delta_stats→cons_si_cur_actv_trans)

JF (jump factor)=servinfop→serv_incr_val

Then invoke the previous process of finding the slot by setting x based on remainder. Once the slot is known, this can be updated to the LConn table.
2) At the time of connection/new transaction opening, x may be incremented by 1.
3) At the time of connection close/transaction end, x may be decremented by 1.

4) At the time of stat sync, perform the following:
   a) Stat sync can update the delta stats.
   b) reset the value of x to zero.
   c) performed the steps mentioned in 1).

In some embodiments, with respect to memory usage, the multi-core system may allocate a 1024 bucket hash table at the creation of the vserver. Most of the buckets may stay empty most of the time except in the case of weighted Lconn and persistence.

In some embodiments, the multi-core system may not maintain a fixed-size hash table, but may create buckets on demand (e.g., as and when the need arises). A bucket may sometimes be referred to as a slot. The individual buckets (e.g., a doubly linked-list) may be created/deleted dynamically as connections close/open respectively. A vsvr_serv_tqh_arr member may be removed from the lc_hash_lb_t u_lc_hash_lb hash table entry. hash_cache_entry_t hash_cache_arr may be present in the hash table and be used in load balancing Hash algorithms. A head of the list may be added to the corresponding vserver. This list may be sometimes referred to as "LConn Slot List".

In some embodiments, each bucket may have sub-slots which in-turn may have a list (TAILQ) of services/bindings. Except with the overhead of creating a bucket if necessary and removing a bucket when no services exist in the bucket, services movements may proceed according to sub-slotting and/or averaging logic processes discussed herein. With respect to the slot allocation logic, an allocator (e.g., Slab allocator) may be used to allocate the memory. The allocator may maintain a free list. Memory may be taken from the free list instead of being allocated by another approach. With respect to slot freeing logic, a slot may be freed to the allocator. The load balancer may not free the memory directly but put the freed chunk in the free list, so that it can be used again. In some embodiments, the load balancer may utilize the global pool for all the vservers. This may provide more availability of memory across the system and may lead to less fragmentation of the memory. This may also help in performing garbage collection when the system is under a resource crunch.

In some embodiments, the load balancer may configure an overflow bucket. The overflow bucket may be associated with one or more cores, vservers and/or PEs. The overflow bucket may comprise a place holder for a service/binding when the service/binding cannot be put in a slot due to memory unavailability during a memory crunch situation. The service/binding may be put in the overflow bucket in case of memory unavailability during memory crunch. The service/binding may be moved into slots at the time of stat sync. The service/binding may not be moved into slots during dataplane. At the insertion of a new bucket/slot in the LConn list, the load balancer may check the overflow list since there may be services in the overflow list that fit in this new bucket. If the overflow bucket is present, the overflow bucket may be used along with the slot list to find the service with least active transaction count, at the time of service selection for incoming request. In some embodiments, to simplify some of the setup and/or operations, the load balancer may keep overflow bucket sorted. Stat-sync (e.g., in 100 ms) may try to place services from the over flow bucket into the slot(s) to the extent possible. On stat sync, if the load balancer continues to have services in a overflow bucket, bind order reordering should be avoided. Bind order reordering may cause banding issues within services with the same transaction count.

In some embodiments, to address the above issue, whenever an overflow bucket is present, the load balancer may operate according to the traditional LConn algorithm, which is independent of sync order and does not have averaging. Thus, banding may not take place. Thus, in certain embodiments, until all the services move out of the overflow bucket, the system may leverage on traditional LConn. Traditional LConn may require significant CPU usage. In some embodiments, use of an overflow bucket may happen rarely or occasionally, e.g., under resource/memory crunch, and may not happen in regular cases. Therefore, CPU usage may be effective overall.

In some embodiments, the load balancer performs insertion of a service/binding to a slot in a LConn list. Insertion may happen when the load balancer or device binds a service with a vserver, or when a service's state changes from any state to UP/active. In connection with inserting the service into the load balancing list, one or more steps may be performed, for example:
   (i) Check whether a slot corresponding to the number of active connections is present ?
      1. If YES: insert the binding in the subslot in the slot found based on ownership of the service.
      2. If NO: an allocator may assign memory from a free list that it maintains, to allocate a slot.
   (ii) Based on the above:
      3. If the slot allocation is successful: check overflow bucket for services that can fit in the new slot, put these services/bindings in the new slot from the overflow bucket, and insert the new service.
      4. If the slot allocation is unsuccessful: place the service in the overflow bucket.

In some embodiments, the load balancer performs removal of service/binding from a slot in the LConn list. Removal may happen when unbinding a service with a corresponding vserver, or when a service state is changed from UP to any other state. In connection with removing the service into the load balancing list, one or more steps may be performed, for example:
   (i) Remove the binding from the slot.
   (ii) Check if the slot is empty.
      1. If YES: The slot may be de-allocated or freed to a free list maintained by an allocator, so that it can be used again.
      2. If NO: Do nothing.

In some embodiments, the load balancer may receive a new request. When a new incoming request arrives to a vserver on which the LConn method is configured, one or more steps may be performed, for example:
   (i) Is Slot list is empty?
      1. If NO:
         a. The active transaction count may be incremented.
         b. If Overflow list is present ?
            i. If NO:
               Starting from the best subslot of the head slot, find the first service which is useable and then go to step (d).
            ii. If YES:
               Starting from the head of the slot and moving in parallel in overflow bucket O(1) approach as Overflow bucket is sorted, find the service having the least active transaction count.
               If the service is found in slots, jump to step (d).
               If the service is found in OF list, jump to step (c).
         c. Is there any change in the slot index due to the change in the active number of connections (conn=conn+1)? Due to averaging logic, there may or may not be a change in slot index):
            i. If YES: Remove the service from the OF list and jump to step (e).

ii. If NO: Put the service at end of the services with same index in the overflow bucket itself and go to step (f).
d. Is there any change in the slot index due to the change in the active number of connections (conn=conn+1)? Due to averaging logic, there may or may not be a change in the slot index:
i. If YES: perform the steps described above in connection with the removal of service/binding from a slot in the LConn list, and then jump to (e).
ii. If NO: Put the service at the tail within same subslot and slot and go to step (f).
e. Put the service in the next slot according to the steps for insertion of a service/binding to a slot in a LConn list.
f. Done.
2. If YES:
g. The load balancer may perform traditional Lconn, using existing traditional Lconn logic, as all the services are in the overflow bucket and traditional Lconn has the advantage of "no ordering" over the overflow bucket.

In some embodiments, the load balancer may handle a request completion. When the request of service completes, one or more steps may be performed, for example:
(a) The active transaction count will be decremented.
(b) Is service is present in Slot List:
(i) If YES: Is there any change in the slot index due to the change in active number of connections (conn=conn−1)? Due to averaging logic, there may or may not be a change in slot index:
1. If YES: perform the steps described above in connection with the removal of service/binding from a slot in the LConn list, and then jump to (c).
2. If NO: Do nothing and jump to (d).
(ii) If NO: The service is part of Overflow List, Is there any change in Slot index due to the change in the active number of connections (conn=conn−1)? Due to averaging logic, there may or may not be a change in the slot index:
1. If YES: Remove the service from the overflow list and then jump to (c).
2. If NO: Do nothing and jump to (d).
(b) Put the service in the new slot according to the steps described above for insertion of a service/binding to a slot in a LConn list.
(c) Done.

In some embodiments, the load balancer may perform a LB stat sync. One or more steps may be performed in the lb stat sync, for example:
(a) The stat sync may occur as it presently does.
(b) The load balancer may go through all the bindings of selected service one by one.
(c) If there is a change in any slot for any given service's binding due to stat sync:
(i) perform the steps described above in connection with the removal of service/binding from a slot in the LConn list.
(ii) perform the steps described above in connection with insertion of a service/binding to a slot in a LConn list
(d) If the binding is present in the Overflow bucket, then attempt to put it back to a existing or new slot by performing the steps described above in connection with insertion of a service/binding to a slot in a LConn list.

In certain embodiments, the device may include features for traffic pattern testing, tracking and/or analysis. For example, the device may include any form or type of user interface that can show graphs of traffic that is live or under simulation. The output of the graph may include a chart of active transactions and the associated standard deviation. The device may include a tool to carry out state-full testing. The tool may be able to setup any given state required for the test without actually sending the traffic through a back door (e.g., via nsapimgr). By way of illustration, a simplified example of the tool may include:
Test 1: {Setup: "S1: "100:100:100", S2: "101:101:101"",
Input: "Tx: ""PE-0": 1, PE-1:1"
Output: "Hit: "S1, S1"}

The test may setup the device with S1 having 100 connections and S2 having 101 connections on each PE, in a 3 PE system. The test may send two transactions: one to PE-0 and other to PE-1. The tool may expect that both the transactions should hit S1.

Figure 7M:
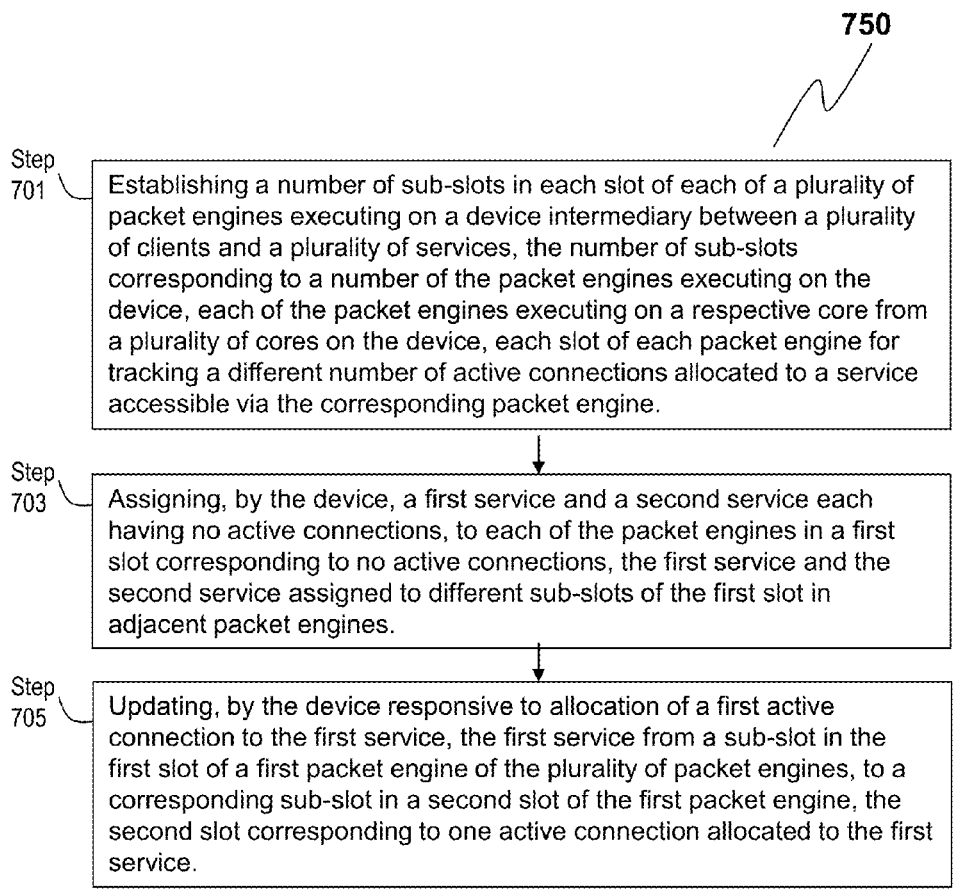
FIG. 7M is a flow diagram of an embodiment of a method for least connection load balancing by a multi-core device.

Referring now to FIG. 7M, a method for load balancing a plurality of connections to a plurality of services across a plurality of packet engines of a multi-core device is depicted. The method may include establishing a number of sub-slots in each slot of each of a plurality of packet engines executing on a device intermediary between a plurality of clients and a plurality of services (701). The number of sub-slots may correspond to a number of the packet engines executing on the device. Each of the packet engines may execute on a respective core from a plurality of cores on the device. Each slot of each packet engine may track a different number of active connections allocated to a service accessible via the corresponding packet engine. The device may assign a first service and a second service each having no active connections, to each of the packet engines in a first slot corresponding to no active connections (703). The first service and the second service may be assigned to different sub-slots of the first slot in adjacent packet engines. The device may update, responsive to allocation of a first active connection to the first service, the first service from a sub-slot in the first slot of a first packet engine of the plurality of packet engines, to a corresponding sub-slot in a second slot of the first packet engine (705). The second slot may correspond to one active connection allocated to the first service.

Referring now to (701), and in further details, the load balancer may establish a number of sub-slots in each slot of each of a plurality of packet engines executing on a device intermediary between a plurality of clients and a plurality of services. The load balancer may apply the subslotting scheme to address uneven load balancing across the PEs when using a least-connections approach at low traffic rates. The load balancer may apply this subslotting scheme to address side-effect(s) of averaging and/or ordering in the least-connections approach's stats sync process.

The number of sub-slots may correspond to a number of the packet engines executing on the device. The number of sub-slots in each slot may be the same, and this may be configured to be the same across a plurality of packet engines. The load balancer or a configuration module may configure the number of subslots in each slot to be equal to the number of available or active PEs. When a slot or bucket is established for a packet engine, the load balancer or a configuration module may divide the slot by the predetermined number of PEs. By placing services in different subslots across PEs, distribution skew due to the ordering of services may be avoided or alleviated. With the subslot approach, once a service receives one connection, the service may be placed in a higher slot, such that it does not have to compete (e.g., with another service) until all the other services receives a connection. The order in which the services receives connections may vary and thus avoids having multiple packet engines opening connections to same service.

Each of the packet engines may execute on a respective core from a plurality of cores on the device. Each of the packet engines may correspond to a vserver executing on a core. In certain embodiments, each core of the multi-core system may execute or support one packet engine and/or vserver. In other embodiments, a core may support or execute a plurality of vservers and/or packet engines. Each vserver may comprise a packet engine for processing or handling one or more connections with a backend server or service. Each slot of each packet engine may track, indicate, represent or associate with a different number of active connections allocated to a service accessible via the corresponding packet engine. The load balancer may place a plurality of active services in subslots corresponding to each PE. The subslots resides in slots that tracks the number of active connections handled by a particular service. For example, if service S1 is present in slot 2, it may mean that two active connections have been allocated to a service accessible via the corresponding packet engine.

Referring now to (703), and in further details, the device may assign one (e.g., a first) service and another (e.g., a second) service each having no active connections, to each of the packet engines in a first slot corresponding to no active connections. The services may be assigned to different subslots of the first slot in adjacent packet engines. In some embodiments, the load balancer or configuration module may assign or place the services in a round robin fashion in subslots across PEs. The load balancer or configuration module may assign or place the services in different subslots across the PE, e.g., so that the order of services have little or not effect in forming distribution skew. If there are no active connections assigned to the services, the load balancer may distribute both services to slot 0 (but different subslots) of each packet engine.

The device may add the (e.g., first) service to the first slot (e.g., slot 0) of the first packet engine. If no other existing service has been added prior to the slot, the device may set a pointer to a sub-slot of the first slot to which the service has been added. The pointer may be used in allocating a new connection to a service. The load balancer may establish a connections list (e.g., a LConn list or table) to track the pointer. If the number of services assigned to each packet engine exceeds the number of packet engines, the load balancer may assign a third service to the sub-slot of each packet engine to which the (e.g., first) service is assigned.

In some embodiments, the load balancer may have to handle or distribute services when the number of services is not exactly divisible by the number of packet engines executing on the device (Num_PPEs). The multi-core device may distribute the services across a plurality of subslots of each packet engine. If there are no active connections assigned to the services, the services may be distributed to slot 0 of each packet engine. A plurality of services may be distributed sequentially, one to each subslot. Any remaining services may each be distributed to a different subslot occupied by another service, e.g., pairing of services in a subslot. More than two services may be distributed to a particular subslot. The pairing or grouping of services in a subslot may be configured such that the same configuration of services (e.g., S1 and S4) are grouped together in one subslot in each packet engine. Each service (or group of services) may be distributed or assigned to different sub-slots between adjacent packet engines, for example, as illustrated in FIG. 7B.

In some embodiments, the multi-core device may have to handle or distribute services when the number of services is less than Num_PPEs. If the number of services assigned to each packet engine is less than the number of packet engines, the load balancer may assign the services to a same group of sub-slots for each packet engine. The load balancer may distribute the services a subset of the subslots in each of the packet engines. The subset of subslots may comprise a number of the lowest subslots in each slot. The assignment of each service (e.g., with no active connections or transactions) may be configured such that a service is not assigned to the same subslot between adjacent packet engines.

Referring now to (705), and in further details, the device may update, responsive to allocation of a first active connection to the (e.g., first) service, the service from a sub-slot in the first slot of a corresponding packet engine of the plurality of packet engines, to a corresponding sub-slot in a second slot of the packet engine. The second slot may correspond to one active connection allocated to the first service. The load balancer may update, responsive to allocation of a first active connection to another (e.g., second) service, the second service from a sub-slot in the first slot of a corresponding (e.g., second) packet engine of the plurality of packet engines, to a corresponding sub-slot in a second slot of the second packet engine. The second slot may correspond to one active connection allocated to the second service.

The device may select a service from the plurality of services to handle an incoming connection. The device may select a PE (and an associated service) from the plurality of PEs to handle an incoming connection. In some embodiments, service/server selection is based on the service at the head of a list (e.g., a LConn list). The head or comprise or be associated with a pointer (e.g., index vsvr_best_idx), which may point to a service/PE for receiving a next transaction/connection. The load balancer may update the pointer/list in at least 2 situations: (a) when a service is removed from a slot, and (b) when a service is enqueued, assigned, allocated or added to a slot. These situations may involve at least one of a connection close, connection open, disable/enable service, load balancing stat sync, etc.

The load balancer may update, responsive to removal of the first active connection from the (e.g., first) service, the service from the sub-slot in the second slot of the corresponding packet engine, to the corresponding sub-slot in the first slot of the packet engine. The load balancer may update, responsive to removal of an active connection (e.g., the first connection) from the (e.g., first) service, the service from a sub-slot in the Xth slot of the first packet engine to a corresponding sub-slot in the (X−1)th slot of the first packet engine. The load balancer may set the pointer to a next available sub-slot of the Xth slot if no other service remains in the Xth slot. The pointer may be used in allocating a new connection to a service. When a service is removed from a slot, the pointer may be updated if the slot became empty. The load balancer may search for a next higher slot (e.g., higher number of connections) that has a service and may update the point to it. When a service is enqueued to a slot, the pointer may be updated if the service is being enqueued to a slot lower (e.g., less number of connections) than the current pointed location.

The load balancer may re-assign one or more remaining services to one or more slots of the packet engines if an existing service is removed or a new service added. In some embodiments, the load balancer performs insertion of a service/binding to a slot via a LConn list. Insertion may happen when the load balancer or device binds a service with a vserver, or when a service's state changes from any state to UP/active. In connection with inserting the service into the load balancing list, one or more steps may be performed as described earlier. In some embodiments, the load balancer performs removal of service/binding from a slot in the LConn list. Removal may happen when unbinding a service with a corresponding vserver, or when a service state is changed from UP to any other state. In connection with removing the service into the load balancing list, one or more steps may be performed as described earlier.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as disclosed herein.

We claim:

1. A method for load balancing a plurality of connections to a plurality of services across a plurality of packet engines of a multi-core device, the method comprising:
   (a) establishing a number of sub-slots in each slot of each of a plurality of packet engines executing on a device intermediary between a plurality of clients and a plurality of services, the number of sub-slots corresponding to a number of the packet engines executing on the device, each of the packet engines executing on a respective core from a plurality of cores on the device, each slot of each packet engine for tracking a different number of active connections allocated to a service accessible via the corresponding packet engine;
   (b) assigning, by the device, a first service and a second service each having no active connections, to each of the packet engines in a first slot corresponding to no active connections, the first service and the second service assigned to different sub-slots of the first slot in adjacent packet engines, the first service and the second service configured to be allocated with active connections for load balancing by the device; and
   (c) updating, by the device responsive to allocation of a first active connection to the first service, the first service from a sub-slot in the first slot of a first packet engine of the plurality of packet engines, to a corresponding sub-slot in a second slot of the first packet engine, the second slot corresponding to one active connection allocated to the first service via the load balancing.

2. The method of claim 1, comprising updating, by the device responsive to allocation of a first active connection to the second service, the second service from a sub-slot in the first slot of a second packet engine of the plurality of packet engines, to a corresponding sub-slot in a second slot of the second packet engine, the second slot corresponding to one active connection allocated to the second service.

3. The method of claim 1, comprising updating, by the device responsive to removal of the first active connection from the first service, the first service from the sub-slot in the second slot of the first packet engine to the corresponding sub-slot in the first slot of the first packet engine.

4. The method of claim 1, comprising updating, by the device responsive to removal of the first active connection from the first service, the first service from a sub-slot in the Xth slot of the first packet engine to a corresponding sub-slot in the (X−1)th slot of the first packet engine.

5. The method of claim 4, comprising setting a pointer to a next available sub-slot of the Xth slot if no other service remains in the Xth slot, the pointer for use in allocating a new connection to a service.

6. The method of claim 1, comprising adding, by device, the first service to the first slot of the first packet engine, and if no other existing service has been added prior to the slot, and setting a pointer to a sub-slot of the first slot to which the first service has been added, the pointer for use in allocating a new connection to a service.

7. The method of claim 6, comprising establishing a connections list to track the pointer.

8. The method of claim 1, wherein if the number of services assigned to each packet engine exceeds the number of packet engines, step (b) further comprises assigning a third service to the sub-slot of each packet engine to which the first service is assigned.

9. The method of claim 1, wherein if the number of services assigned to each packet engine is less than the number of packet engines, step (b) further comprises assigning the services to a same group of sub-slots for each packet engine.

10. The method of claim 1, comprising re-assigning one or more remaining services to one or more slots of the packet engines if an existing service is removed or a new service added.

11. A system for load balancing a plurality of connections to a plurality of services across a plurality of packet engines of a multi-core device, comprising:
    a plurality of packet engines executing on a device intermediary between a plurality of clients and a plurality of services; and
    a load balancer executing on the device, the load balancer:
        establishing a number of sub-slots in each slot of each of the plurality of packet engines, the number of sub-slots corresponding to a number of the packet engines executing on the device, each of the packet engines executing on a respective core from a plurality of cores on the device, each slot of each packet engine for tracking a different number of active connections allocated to a service accessible via the corresponding packet engine,
        assigning a first service and a second service each having no active connections, to each of the packet engines in a first slot corresponding to no active connections, the first service and the second service assigned to different sub-slots of the first slot in adjacent packet engines, the first service and the second service configured to be allocated with active connections for load balancing by the device, and
        updating, responsive to allocation of a first active connection to the first service, the first service from a sub-slot in the first slot of a first packet engine of the plurality of packet engines, to a corresponding sub-slot in a second slot of the first packet engine, the second slot corresponding to one active connection allocated to the first service via the load balancing.

12. The system of claim 11, wherein the load balancer updates, responsive to allocation of a first active connection to the second service, the second service from a sub-slot in the first slot of a second packet engine of the plurality of packet engines, to a corresponding sub-slot in a second slot of the second packet engine, the second slot corresponding to one active connection allocated to the second service.

13. The system of claim 11, wherein the load balancer updates, responsive to removal of the first active connection from the first service, the first service from the sub-slot in the second slot of the first packet engine to the corresponding sub-slot in the first slot of the first packet engine.

14. The system of claim 11, wherein the load balancer updates, responsive to removal of the first active connection from the first service, the first service from a sub-slot in the Xth slot of the first packet engine to a corresponding sub-slot in the (X−1)th slot of the first packet engine.

15. The system of claim 14, wherein the load balancer sets a pointer to a next available sub-slot of the Xth slot if no other service remains in the Xth slot, the pointer for use in allocating a new connection to a service.

16. The system of claim 11, wherein the load balancer adds the first service to the first slot of the first packet engine, and if no other existing service has been added prior to the slot, and sets a pointer to a sub-slot of the first slot to which the first service has been added, the pointer for use in allocating a new connection to a service.

17. The system of claim 16, wherein the load balancer establishes a connections list to track the pointer.

18. The system of claim 11, wherein if the number of services assigned to each packet engine exceeds the number of packet engines, the load balancer assigns a third service to the sub-slot of each packet engine to which the first service is assigned.

19. The system of claim 11, wherein if the number of services assigned to each packet engine is less than the number of packet engines, the load balancer assigns the services to a same group of sub-slots for each packet engine.

20. The system of claim 11, wherein the load balancer re-assigns one or more remaining services to one or more slots of the packet engines if an existing service is removed or a new service added.

* * * * *